(12) United States Patent
Goman et al.

(10) Patent No.: US 7,395,652 B2
(45) Date of Patent: Jul. 8, 2008

(54) REEL MOWER WITH ADJUSTABLE BEDKNIFE HAVING CONSTANT LONGITUDINAL LOCATION RELATIVE TO REEL

(75) Inventors: Gerald E. Goman, Spring Valley, WI (US); Christopher C. Dickey, West St. Paul, MN (US); Robert D. Patton, Elko, MN (US); Donald B. Schnotala, Burnsville, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/711,470

(22) Filed: Feb. 27, 2007

(65) Prior Publication Data
US 2007/0227112 A1 Oct. 4, 2007

Related U.S. Application Data

(62) Division of application No. 10/620,328, filed on Jul. 15, 2003, now Pat. No. 7,191,584, which is a division of application No. 09/892,194, filed on Jun. 26, 2001, now Pat. No. 6,622,464.

(60) Provisional application No. 60/214,133, filed on Jun. 26, 2000.

(51) Int. Cl.
*A01D 34/53* (2006.01)

(52) U.S. Cl. .......................................... 56/249; 56/294

(58) Field of Classification Search ................... 56/249, 56/294, 10.2 R, 250, 253, 251; 241/239, 241/241
See application file for complete search history.

(56) References Cited

U.S. PATENT DOCUMENTS 2,329,952 A 9/1943 Speiser
2,496,973 A 2/1950 Worthington (Continued)

FOREIGN PATENT DOCUMENTS

AT 280680 4/1970

(Continued)

*Primary Examiner*—Árpád Fábián-Kovács
(74) *Attorney, Agent, or Firm*—James W. Miller

(57) ABSTRACT

A walk reel mower includes a pair of inclined rigid links for mounting the reel cutting unit to the reel mower frame for rolling about a longitudinal axis, and a pair of vertical support arms for mounting the reel cutting unit to the reel mower frame for pitching about a transverse axis. An integrated gearbox houses both the traction and reel drives, including the differential that is part of the traction drive, as well as a parking brake. A flexible drive shaft powers the cutting reel from the gearbox and is made from materials that do not require petroleum based lubricants to avoid the possibility of damage to the turf or grass. A single control handle located on the handle of the mower actuates both the reel and traction drives. The reel cutting unit includes a back plate which has a portion formed as a hollow beam for strength. The reel cutting unit also has a pivot axis for the bedknife allowing adjustment of the bedknife relative to the cutting reel without changing the longitudinal location of the front edge of the bedknife to ensure consistent cutting of the cutting unit. Finally, an improved mounting for the grass basket used on the cutting unit is disclosed which mounting avoids inadvertent disengagement of the grass basket from the cutting unit.

1 Claim, 18 Drawing Sheets

U.S. PATENT DOCUMENTS

| | | | |
|---|---|---|---|
| 2,505,879 A | | 5/1950 | Blydenburgh |
| 2,532,733 A | * | 12/1950 | Sawtelle .................... 56/253 |
| 2,786,321 A | | 3/1957 | Lill |
| 2,896,390 A | * | 7/1959 | Cunningham ............... 56/249 |
| 3,680,293 A | * | 8/1972 | Klemenhagen ............. 56/249 |
| 4,335,569 A | * | 6/1982 | Keeney et al. ............... 56/249 |
| 4,479,346 A | | 10/1984 | Chandler |
| 4,481,757 A | | 11/1984 | Tsuchiya |
| 4,516,388 A | * | 5/1985 | Chandler .................... 56/249 |
| 4,606,178 A | * | 8/1986 | Saiia .......................... 56/249 |
| 4,637,204 A | * | 1/1987 | Benson et al. ............... 56/249 |
| 4,663,924 A | * | 5/1987 | Saiia .......................... 56/249 |
| 5,291,724 A | | 3/1994 | Cotton |
| 5,477,666 A | * | 12/1995 | Cotton ....................... 56/251 |
| 5,678,396 A | * | 10/1997 | Thorman et al. ................ 56/7 |
| 6,044,637 A | * | 4/2000 | Thier et al. .................. 56/249 |

FOREIGN PATENT DOCUMENTS

| | | |
|---|---|---|
| EP | 0189619 | 8/1986 |
| GB | 517727 | 2/1940 |
| GB | 520582 | 4/1940 |
| GB | 2137063 | 10/1984 |
| GB | 2169181 | 7/1986 |

* cited by examiner

REEL MOWER WITH ADJUSTABLE BEDKNIFE HAVING CONSTANT LONGITUDINAL LOCATION RELATIVE TO REEL

CROSS REFERENCE TO RELATED APPLICATIONS

This application is a division of application Ser. No. 10/620,328, filed Jul. 15, 2003, now U.S. Pat. No. 7,191,584 which is a division of application Ser. No. 09/892,194, filed Jun. 26, 2001, U.S. Pat. No. 6,622,464, which claims the benefit of provisional application No. 60/214,133 filed Jun. 26, 2000.

TECHNICAL FIELD

This invention relates to a walk reel mower having a reel cutting unit that "floats" relative to the reel mower frame to allow the reel cutting unit to conform to the ground contours to avoid scalping and/or scuffing of the turf being cut. In addition, this invention relates to a gearbox that integrates the traction and reel drives of the reel mower, to a self-lubricating drive shaft that transfers drive to the cutting reel, to a single control handle for operating both the traction and reel drives, to an improved mounting on the reel mower frame for supporting the grass collecting basket, to an improved pivotal mounting for the bedknife, and to an improved back plate construction for the reel cutting unit.

BACKGROUND OF THE INVENTION

Walk reel mowers are known for precision cutting of grass and the like, such as the grass found on golf greens. Such reel mowers typically have a frame which carries a reel cutting unit. A handle assembly extends upwardly and rearwardly from the frame to allow an operator who walks behind the mower to guide and operate the mower. The handle assembly includes various controls for allowing the operator to selectively engage and disengage the traction drive of the mower as well as the reel cutting unit.

Prior art walk reel mowers are known in which the reel cutting unit is carried rigidly on the frame, like that shown in U.S. Pat. No. 5,477,666 to Cotton or U.S. Pat. No. 4,481,757 to Tsuchiya. Such a cutting unit does not pitch, roll or yaw relative to the frame to adapt itself to the contours of the ground. When this mower cuts grass on an undulating surface, it is quite possible to scalp or scuff the grass. For example, the grass might be cut too closely on top of a high spot and not closely enough in a low spot. This is undesirable.

Other reel mowers, such as that shown in U.S. Pat. No. 2,972,218, disclose walk reel mowers having a "full floating cutting unit" that can move in three degrees of freedom relative to the mower frame. This is done by making the cutting unit self-supporting on its own front and rear rollers. The cutting unit is then suspended from the mower frame by a set of chains that are normally slack when the cutting unit is in engagement with the ground. The slack chains allow the cutting unit to move relative to the mower frame to better follow the contours of the ground to minimize instances of scalping and/or scuffing and to help provide a more consistent height of cut.

While the ground contour following characteristics of a reel mower are not possessed by a reel mower with a cutting unit that is rigid with the frame, the use of chains to support the cutting unit provides disadvantages of its own. When the operator pushes down on the handle assembly to raise the front end of the reel mower, the cutting unit does not immediately lift up off the ground. The chains first have to tighten before the cutting unit lifts up off the ground. Thus, when pushing down on the handle to lift the cutting unit off the ground, the operator first feels a smooth motion while the chains tighten and then feels a jerk or discontinuity when the operator suddenly has to push down harder to get the cutting unit to come up.

The jerk or discontinuity felt by the operator in the handle as the operator pushes down on the handle to raise the cutting unit is a disadvantage. Most operators prefer cutting units in which one can push down on the handle to raise the cutting unit and this can be done in a smooth motion with the cutting unit raising immediately. This is simply not possible with cutting units suspended by chains that must be tightened before the cutting unit rises.

U.S. Pat. No. 2,329,952 to Speiser discloses a walk reel mower in which a reel cutting unit is mounted on the rear of the mower frame. However, the cutting unit has a floating capability in that the cutting unit can pitch and roll relative to the frame by virtue of transverse and longitudinal pivots between the cutting unit and the mower frame. While this provides a ground contour following ability without using slack chains to support the cutting unit, pushing down on the handle assembly will not lift the cutting unit off the ground. Thus, the mower shown in the Speiser patent is much more difficult to maneuver than the reel mowers described earlier.

In addition, the cutting unit shown in the Speiser patent is not itself totally self-supporting on the ground, but relies on the traction wheels of the mower frame in conjunction with a roller on the cutting unit for proper ground engaging support. As a result, the fore-and-aft wheelbase of the mower is relatively large. This decreases how effectively the cutting unit will pitch when encountering transverse bumps or undulations in the ground, i.e. bumps or undulations that are perpendicular to the forward direction of motion. If the bump is small enough, the traction wheels may clear the bump before the cutting reel/bedknife interface reaches the high spot of the bump, thus still resulting in scalping.

Another problem with prior art walk reel mowers is the nature of the drives or transmissions used to power the traction drive and the cutting reel. Often, separate drives housed in separate gearboxes are used, one gearbox powering the traction drive and the other gearbox powering the cutting reel. The use of two gearboxes increases expense as well as requiring sufficient space on the mower frame for housing both gearboxes. In addition, the use of two gearboxes gives the mower a cluttered appearance.

Moreover, in many prior art walk reel mowers, a differential is needed to allow the left and right traction wheels, or the left and right traction drum halves, to rotate at different speeds when turning. In many prior art mowers, particularly those having a traction drum formed from traction drum halves including a left traction drum half and a right traction drum half, the differential was not carried in the speed reducing gearbox, but was instead built into the interior of the traction drum. In this location, it was difficult to keep the differential sealed and lubricated, and repair or replacement of the differential was also difficult. Moreover, any leakage of the lubricant from the differential out of the traction drum is problematic as such a lubricant can easily kill or mar the grass or turf being cut by the mower.

Some attempts are disclosed in the art to integrate the drives for the cutting reel and the traction drive into a single gearbox. One such attempt is shown in U.S. Pat. No. 1,709,791 to Jerram, in which the speed reducing gear drives used to power the traction drum and the cutting reel are housed in a common gearbox or gearcase that is built into one of the side plates of the reel mower frame. The clutches used to initiate operation of the drives for the traction drum and the cutting reel are also both housed in this common gearbox. Thus, this mower has only a single gearbox for enclosing both the traction and cutting reel drives, thus having a less cluttered appearance than mowers using multiple gearboxes.

Despite the attempt at simplification shown in the Jerram patent, various deficiencies are still present. For example, the differential for the traction drum is still housed within the interior of the traction drum. This gives rise to the lubricating and lubricant leakage problems discussed above. In addition, the overall drive and differential systems disclosed in Jerram involve the use of a large number of components, which leads again to increased cost.

In reel mowers in which the cutting unit floats to follow the contours of the ground, the drive to the cutting reel has to flex, bend and axially extend and contract to accommodate the floating motion of the cutting unit. In some mowers, such as that shown in the Speiser patent referred to above, this is accomplished using a flexible drive belt extending from one sprocket or pulley on the mower frame to another sprocket or pulley on the cutting unit. It is a problem with such a drive in keeping the belt taut as the cutting unit and mower frame move relative to one another. In addition, flexing or twisting of the drive belt is quite hard on the belt leading to relatively short belt life.

Other non belt type drives are known for the cutting reel. For example, flexible shafts are known for accomplishing this drive with one such shaft shown in U.S. Pat. No. 2,191,135 to Roth. This shaft comprises two universal joints at either end connected by relatively slidable shaft sections. The shaft sections have mating, non-circular cross-sectional configurations to allow torque to be transmitted while the shaft sections slide in and out relative to one another. See FIGS. 7 and 9 of Roth.

While flexible shafts are known for powering floating cutting units, they must be lubricated to function quietly and properly and to have adequate life. Again, having to lubricate a flexible drive shaft to the cutting reel is a problem because such a flexible drive shaft is generally exposed and located above the cutting reel. Thus, the lubricant for the drive shaft or the universal joints at either end can leak and drop down onto the grass or turf, thus damaging the grass or turf. As in the case with leakage of the lubricant from a drum carried differential, this is not desirable.

In many prior art walk reel mowers, the controls used to place the traction drive and cutting reel in operation are separate from one another. In many cases, the control for operating the cutting reel is not carried on the handle assembly, but is located down on the mower frame adjacent the cutting reel itself. The other control for operating the traction drive is located up on the handle assembly. Such a dual control system, with the cutting reel control being down on the mower frame while the traction drive control is on the handle, is shown in U.S. Pat. No. 1,947,117 to Stegeman.

This prior art control system is disadvantageous as it is relatively cumbersome to start and stop the cutting reel. For example, to start and stop operation of the cutting reel, the operator has to walk from behind the handle assembly to a position around in front of the handle assembly in order to reach the control that starts or stops the drive to the cutting reel. After the operator manually actuates this control, the operator must then walk back behind the handle assembly to continue operation of the mower. This back and forth walking motion is obviously inconvenient and tiring to do. As a result, the operator tends to leave the cutting reel in operation even at times when the cutting reel should otherwise be shut off.

In some prior art mowers, such as that shown in the Speiser patent referred to above, the controls for the traction drive and cutting reel are both carried on the handle assembly. At least in this device, the controls can both be reached and operated by the operator without having to walk around in front of the handle assembly. However, two separate controls are still provided, each with its own handle and control linkage. As such, the controls can be somewhat confusing to use as the operator must remember which control operates which item. Moreover, the use of separate controls again unduly clutters the handle assembly.

In walk reel mowers, it is common to collect grass clippings in a grass collection basket mounted to the mower frame so that the basket is positioned in front of the cutting unit. Sometimes, when the operator lifts up on the handle assembly of the mower when maneuvering the mower, it is possible for the grass basket to become disengaged from the mower. This requires that the operator walk around and reattach the basket to the frame. If the basket is partially filled with grass clippings, this can be difficult to do. Even if it can be done, it is inconvenient for the operator to have to reattach the grass basket.

Finally, in many reel mowers, whether they be walk reel mowers or riding reel mowers, it is common to pivot the bedknife towards the cutting reel to compensate for wear in the cutting reel. This has the effect of longitudinally moving the front edge of the bedknife from the position it occupies when the cutting reel is not worn. For example, in a cutting reel with a relatively unworn reel, the front edge of the bedknife might typically be behind the center of the cutting reel by a certain amount. When the reel wears and the bedknife is pivoted up to maintain proper clearance to the cutting reel, this behind the center distance will change.

The Applicants have found that this change in the behind the center distance of the bedknife affects how aggressively the cutting reel cuts. Thus, after the reel becomes worn and the bedknife is adjusted in the manner just described, the cutting unit will cut differently than when the reel was new and the bedknife had not been adjusted from its initial orientation. This change in the quality of the cutting is not desirable. It would be best for the cutting unit to cut approximately the same regardless of how worn the cutting reel has become and whether or not the bedknife has been adjusted to compensate for this wear.

SUMMARY OF THE INVENTION

It is one aspect of this invention to provide a walk reel mower that includes a cutting unit that can at least partially float to follow the contours of the ground. This aspect is provided, inter alia, by a walk reel mower which comprises a reel mower frame on which a power source is carried. An upwardly extending handle assembly is connected at its lower end to the reel mower frame, the handle assembly including a portion which the operator can grip to guide the reel mower frame while the operator walks behind the reel mower frame. A traction drive is provided for propelling the reel mower frame across the ground, the traction drive being powered by the power source. A reel cutting unit is carried on the front of the reel mower frame. The reel cutting unit has a reel cutting unit frame which carries a helically bladed cutting reel which is rotatable about a substantially horizontal, transverse axis, a bedknife which cooperates with the cutting reel such the rotatable cutting reel sweeps standing grass against the bedknife to cut the grass, and front and rear ground engaging wheel or roller supports for allowing the reel cutting unit to be self supporting and to move over the ground. A suspension system comprising relatively rigid links is provided for pivotally connecting the reel cutting unit frame to the reel mower frame such that the reel cutting unit can roll about a substantially horizontal, longitudinal axis.

Another aspect of this invention relates to a walk reel mower which comprises a reel mower frame on which a power source is carried. An upwardly extending handle assembly is connected at its lower end to the reel mower frame, the handle assembly including a portion which the operator can grip to guide the reel mower frame while the operator walks behind the reel mower frame. A traction drive is provided for propelling the reel mower frame across the ground, the traction drive being powered by the power source. A reel cutting unit is carried on the reel mower frame. The reel cutting unit has a cutting reel which is rotatable about a substantially horizontal, transverse axis which reel cooperates with a bedknife to cut grass. A reel drive is provided for powering the cutting reel, the reel drive being powered by the power source. A single gearbox houses the traction drive and the reel drive.

Yet another aspect of this invention relates to the traction drive for a walk reel mower having ground engaging, traction drive elements for propelling the walk reel mower over the ground. The traction drive comprises a planetary gear carrier having a plurality of planetary gears rotating around a sun gear with the planetary gears and sun gear being continuously driven by a power source on the walk reel mower when the power source is operating. A traction drive clutch drum engages the planetary gear carrier and rotates therewith. A traction drive gear is operatively coupled to the planetary gears, the traction drive gear further being operatively coupled to the ground engaging traction elements. A selectively operable brake is provided for engaging the traction drive clutch drum to stop movement of the planetary gear carrier such that the continued rotation of the planetary gears will then rotate the traction drive gear to power the ground engaging traction drive elements.

Another aspect of this invention relates to a drive shaft for transferring rotational torque to a reel cutting unit of a reel mower. The drive shaft has an expandable length and is flexible between each end thereof to accommodate movement of the reel cutting unit relative to the reel mower. The drive shaft is self-lubricating without using petroleum based lubricants.

Yet another aspect of this invention relates to a walk reel mower which comprises a reel mower frame on which a power source is carried. An upwardly extending handle assembly is connected at its lower end to the reel mower frame. The handle assembly includes a portion which the operator can grip to guide the reel mower frame while the operator walks behind the reel mower frame. A traction drive is provided for propelling the reel mower frame across the ground, the traction drive being powered by the power source. A reel cutting unit is carried on the reel mower frame, the reel cutting unit having a cutting reel which is rotatable about a substantially horizontal, transverse axis which reel cooperates with a bedknife to cut grass. A reel drive is provided for powering the cutting reel, the reel drive being powered by the power source. Finally, a single control handle is carried on the handle assembly for selectively controlling the operation of both the traction drive and the reel drive.

Another aspect of this invention relates to a walk reel mower which comprises a reel mower frame on which a power source is carried. An upwardly extending handle assembly is connected at its lower end to the reel mower frame, the handle assembly including a portion which the operator can grip to guide the reel mower frame while the operator walks behind the reel mower frame. A reel cutting unit is carried on the front of the reel mower frame. The reel cutting unit has a reel cutting unit frame which carries a helically bladed cutting reel which is rotatable about a substantially horizontal, transverse axis, and a bedknife which cooperates with the cutting reel such the rotatable cutting reel sweeps standing grass against the bedknife to cut the grass. A grass basket is attached to the reel cutting unit frame ahead of the cutting reel and the bedknife. The grass basket is attached to the reel cutting unit frame by pins on the basket received in sockets on the reel cutting unit frame. The pins and sockets are configured relative to one another so that the grass basket will not be disengaged if the operator lifts up on the handle assembly.

Yet another aspect of this invention relates to a reel cutting unit for a reel mower which comprises a reel cutting unit frame comprising spaced side plates connected to an arcuate back plate. A helically bladed cutting reel is rotatably journalled between the side plates and positioned in front of the back plate. A bedknife extends between the side plates along the length of cutting reel for cooperating with the cutting reel to cut grass. The bedknife is pivotally adjustable relative to the side plates to compensate for wear in the cutting reel. The pivot axis of the bedknife is chosen such that the front edge of the bedknife stays in approximately the same longitudinal location relative to the cutting reel as the front edge of the bedknife rises upwardly to compensate for wear in the cutting reel.

A final aspect of this invention relates to a reel cutting unit for a reel mower which comprises a reel cutting unit frame comprising spaced side plates connected to an arcuate back plate. A helically bladed cutting reel is rotatably journalled between the side plates and positioned in front of the back plate. A bedknife extends between the side plates along the length of cutting reel for cooperating with the cutting reel to cut grass. At least portion of the back plate has a closed tubular cross-sectional configuration. This aspect of this invention also relates to the back plate per se.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

This invention relates to a walk reel mower 2 having a reel cutting unit for cutting grass. The term "walk reel mower" is used in this application to refer to a walk reel mower 2 in which the operator walks behind walk reel mower 2 as walk reel mower 2 is operated. The operator is not supported or carried by walk reel mower 2 as would be the case with a riding reel mower. More particularly, walk reel mower 2 is suited for mowing grass at low heights of cut where precision cutting is required, such as on the greens of a golf course. However, the various aspects of the invention disclosed herein are not limited for use on a walk reel mower for mowing only golf greens, but can be used on walk reel mowers for mowing other turf areas as well.

The Overall Walk Reel Mower

Figure 1:
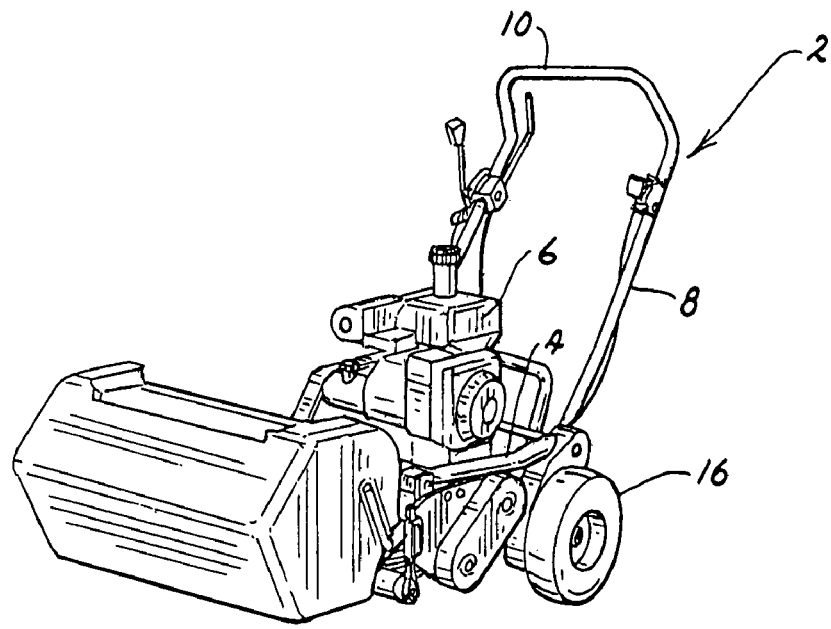
FIG. 1 is a perspective view of a first embodiment of a walk reel mower according to this invention, with the grass collecting basket being shown on the reel cutting unit in this view but with such a basket not being shown in any of FIGS. 2-9 for the purpose of clarity.

FIG. 1 provides an overall view of one embodiment of a walk reel mower 2 according to this invention. Walk reel mower 2 includes a frame 4 on which a power source 6, such as an internal combustion engine, is carried. Other power sources 6 could be used in place of the internal combustion engine or in addition to the internal combustion engine. For example, the internal combustion engine could be replaced by an electric motor driven by a rechargeable battery pack carried on reel mower frame 4 of walk reel mower 2. Alternatively, a hybrid internal combustion engine/battery pack power system could be used for supplying electrical power to an electric motor. Thus, the nature of power source 6 is not important to the various aspects of the invention disclosed herein as long as such a power source 6 has a rotating output shaft from which power can be drawn.

Walk reel mower 2 includes a U-shaped, upwardly extending handle assembly 8 that is connected at its lower end to reel mower frame 4 of walk reel mower 2. Handle assembly 8 includes an upper cross bar 10 which the operator can grip to guide walk reel mower 2 during operation thereof. Various operational controls are provided on handle assembly 8 for allowing the operator to control the operation of the traction drive and cutting reel drive of walk reel mower 2. The embodiment of FIG. 1 discloses a first set of such controls while the embodiment of FIG. 14 discloses a second set of such controls.

Walk reel mower 2 is propelled across the ground by a traction drive including a split traction drum 12 rotatably carried at the rear of reel mower frame 4. Traction drum 12 is split, as is conventional, into two halves, a left half 12*l* and a right half 12*r*. Traction drum halves 12*l* and 12*r* are independently driven by a differential to allow a difference in rotational speed between traction drum halves 12*l* and 12*r* when walk reel mower 2 is turning.

The rotational shaft 14*l* and 14*r* for each traction drum half 12*l* or 12*r* is extended outwardly to mount a transport wheel 16 on each side of walk reel mower 2. Transport wheels 16 are used only when walk reel mower 2 is being driven from one site to another. When walk reel mower 2 is being used to cut grass, transport wheels 16 are removed. Walk reel mower 2 is then supported and driven solely by traction drum 12.

If desired, traction drum halves 12*l* and 12*r* could be replaced by separate left and right drive wheels engaging the ground in the manner of transport wheels 16. In this case, such drive wheels would not be removed and would support walk reel mower 2 for movement over the ground at all times.

Figure 2:
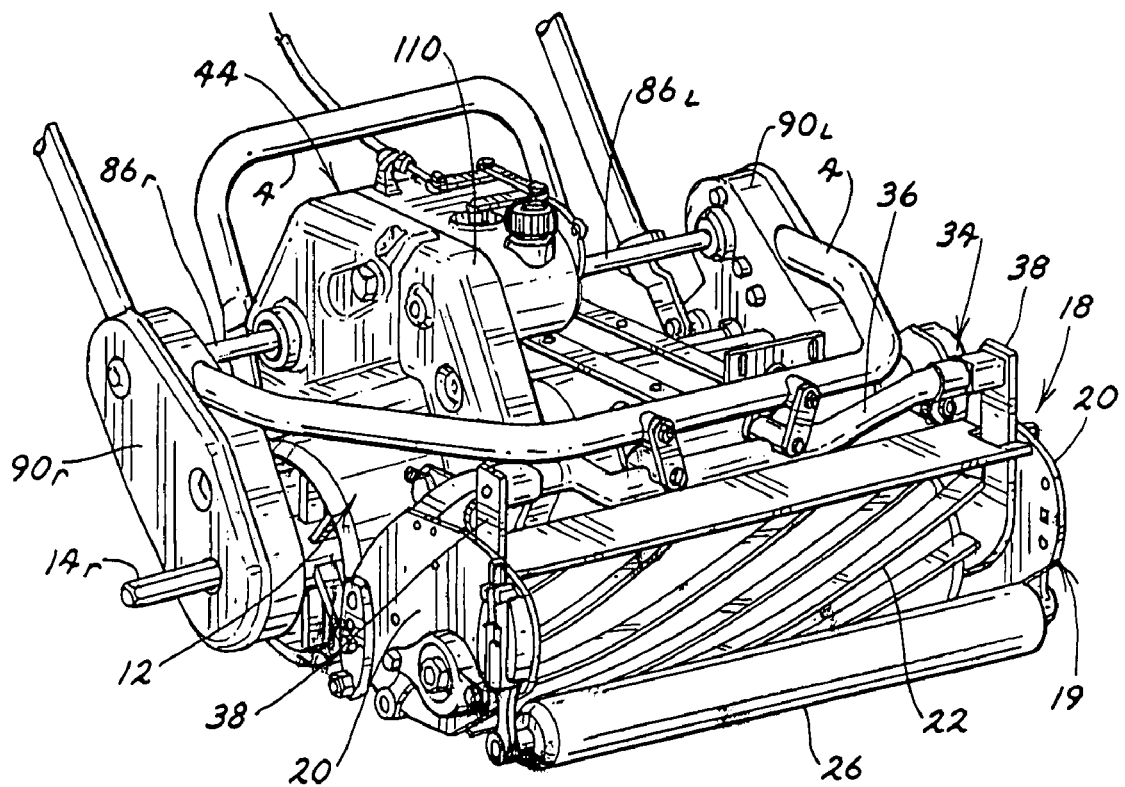
FIG. 2 is a perspective view of a portion of the walk reel mower shown in FIG. 1, particularly illustrating the reel cutting unit and the pair of inclined rigid links that mount the cutting unit carrier frame for rolling motion relative to the reel mower frame.
Figure 4:
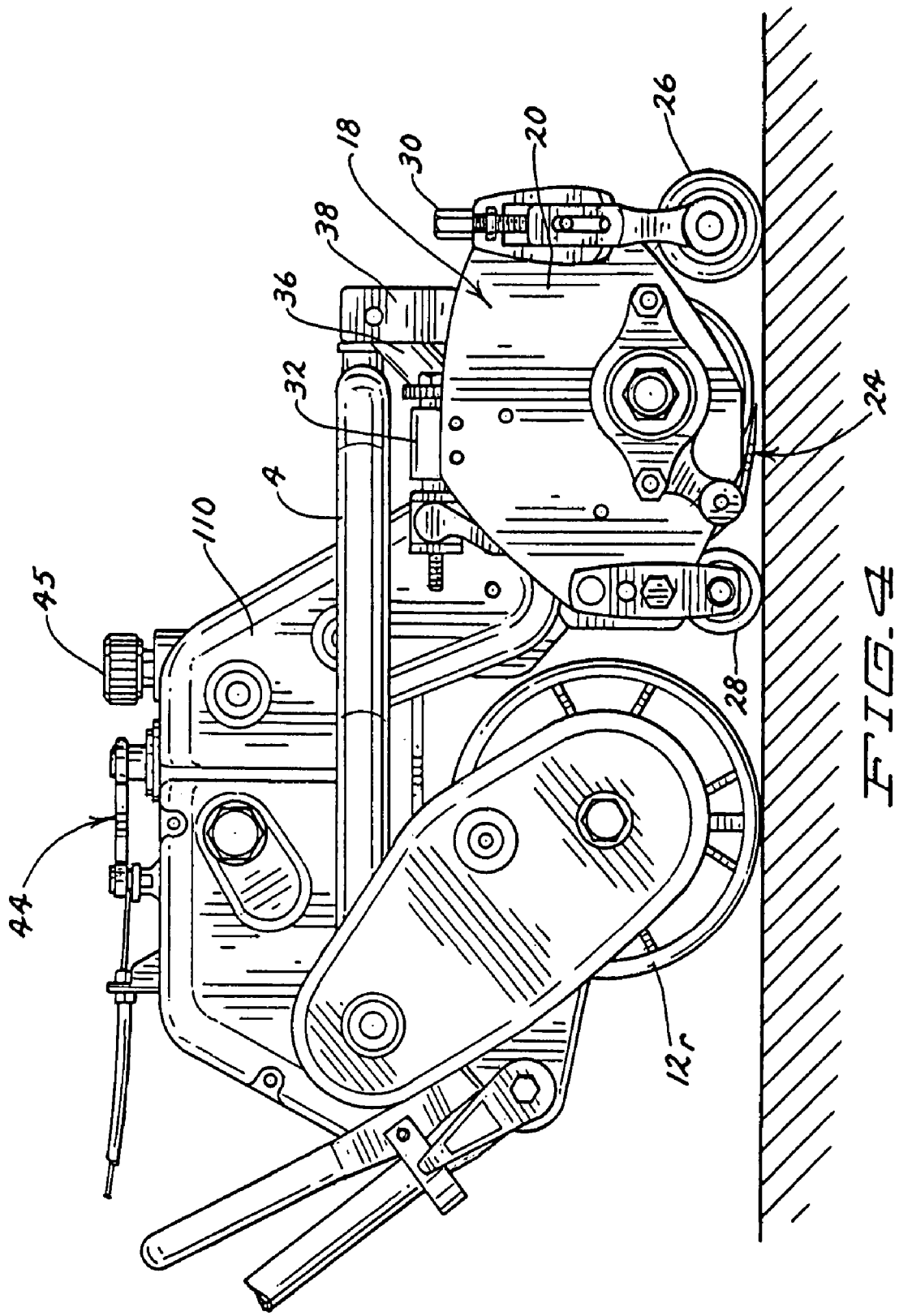
FIG. 4 is a right side elevational view of a portion of the walk reel mower shown in FIG. 1.
Figure 5:
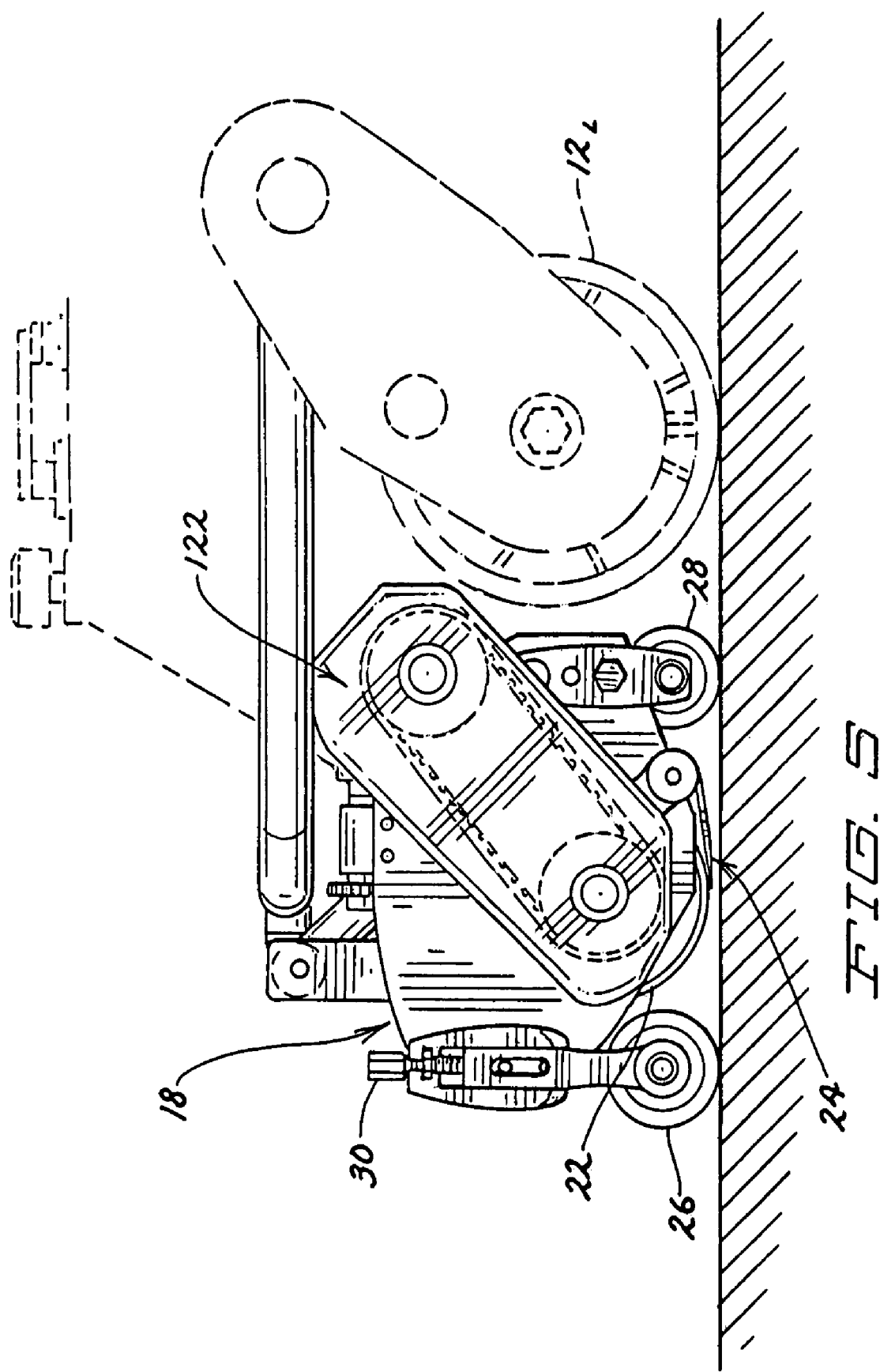
FIG. 5 is a left side elevational view of a portion of the walk reel mower shown in FIG. 1.
Figure 19:
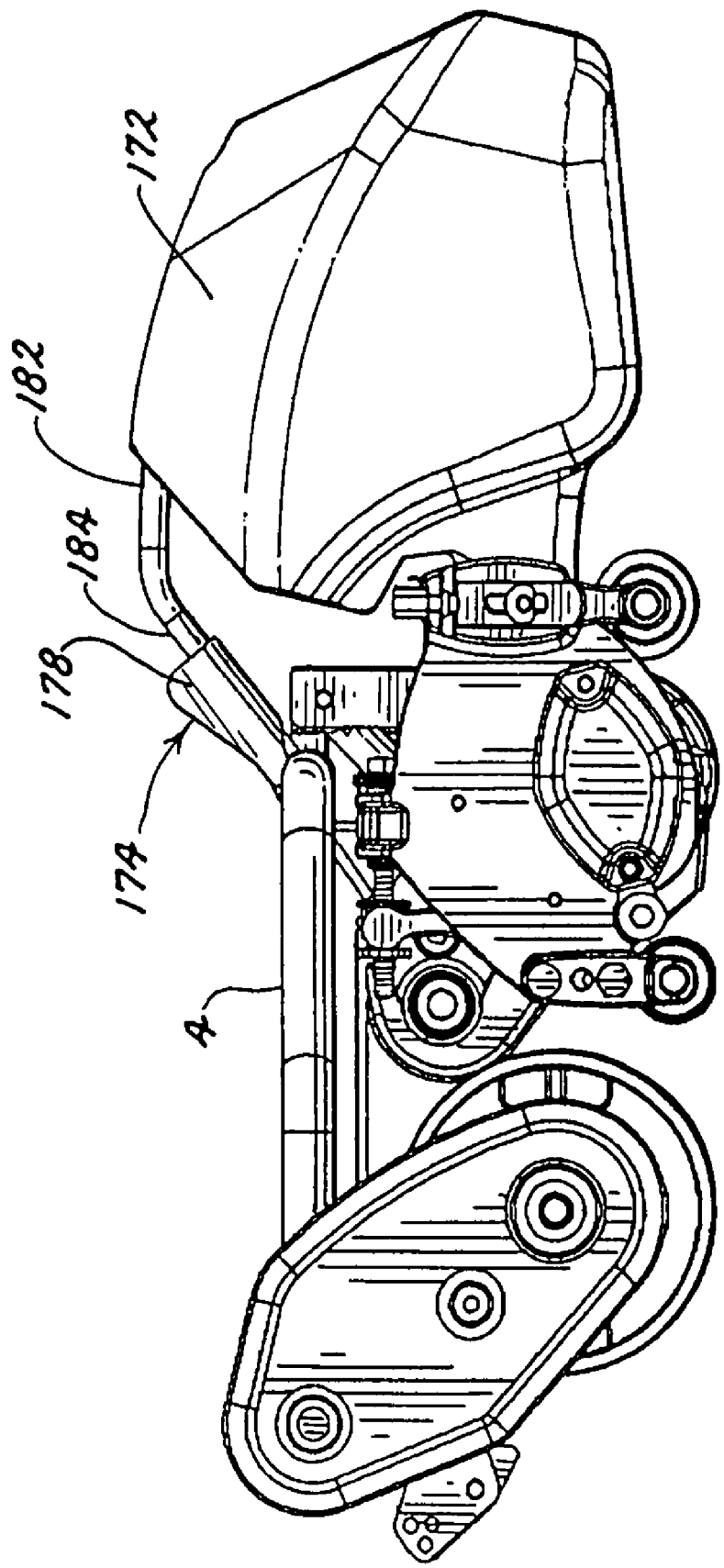
FIG. 19 is a side elevational view of that portion of the walk reel mower shown in FIG. 17.

A reel cutting unit 18 of generally conventional design is carried on the front of reel mower frame 4. Reel cutting unit 18 includes a reel cutting unit frame 19 comprising spaced side plates 20 connected to an arcuate back plate (not shown in FIG. 2). A helically bladed cutting reel 22 is rotatably journalled between side plates 20 and is positioned in front of the back plate. As cutting reel 22 rotates, the reel blades sweep standing grass against a sharpened bedknife 24 to thereby sever the grass. Bedknife 24 extends between side plates 20 along the length of cutting reel 22. Bedknife 24 is shown in FIGS. 4, 5 and 19.

Reel cutting unit 18 is self supporting for rolling over the ground or turf by front and rear rollers 26 and 28 extending between side plates 20. The height of cut can be adjusted in any conventional manner. For example, front roller 26 can be moved up and down relative to side plates 20 by a threaded height adjusting mechanism 30 carried on each side plate 20. In addition, bedknife 24 can be adjusted relative to cutting reel 22 by bedknife adjusters 32 carried on the top of reel cutting unit 18. Such bedknife adjusters 32 are designed to maintain a constant spring force on bedknife 24 throughout the life of cutting reel 22.

The Reel Cutting Unit Suspension System

One aspect of this invention relates to how reel cutting unit 18 is supported on reel mower frame 4. Reel cutting unit 18 is allowed to float or move relative to reel mower frame 4 about two axes. First, reel cutting unit 18 can roll about a longitudinal axis, i.e. a fore-and-aft horizontal axis x. See FIG. 8. Second, reel cutting unit 18 can pitch about a transverse axis, i.e. a side-to-side horizontal axis y which is coaxial with the axis of cutting reel 22. See FIG. 7. Motion of reel cutting unit 18 about the axes x and y allow reel cutting unit 18 to better conform to the contours of the ground being cut to avoid scalping. This is particularly important when cutting golf greens, especially those found on newer golf courses in which the greens often have pronounced undulations.

Reel cutting unit 18 is supported in the above described manner by a generally U-shaped cutting unit carrier frame 34. Cutting unit carrier frame 34 includes a transverse cross member 36 having downwardly extending, vertical support arms 38 at either end thereof. Each vertical support arm 38 passes downwardly through a slot in a top wall of reel cutting unit 18 to lie adjacent one side plate 20. The lower end of each vertical arm 38 includes an inwardly protruding circular hub 40 which rotatably engages or journals the shaft of cutting reel 22. Thus, during operation of walk reel mower 2, reel cutting unit 18 can pivot or rock back and forth in the direction of the arrows A in FIG. 7 by pivoting or rocking on the inwardly protruding hubs 40 of vertical support arms 38.

Figure 3:
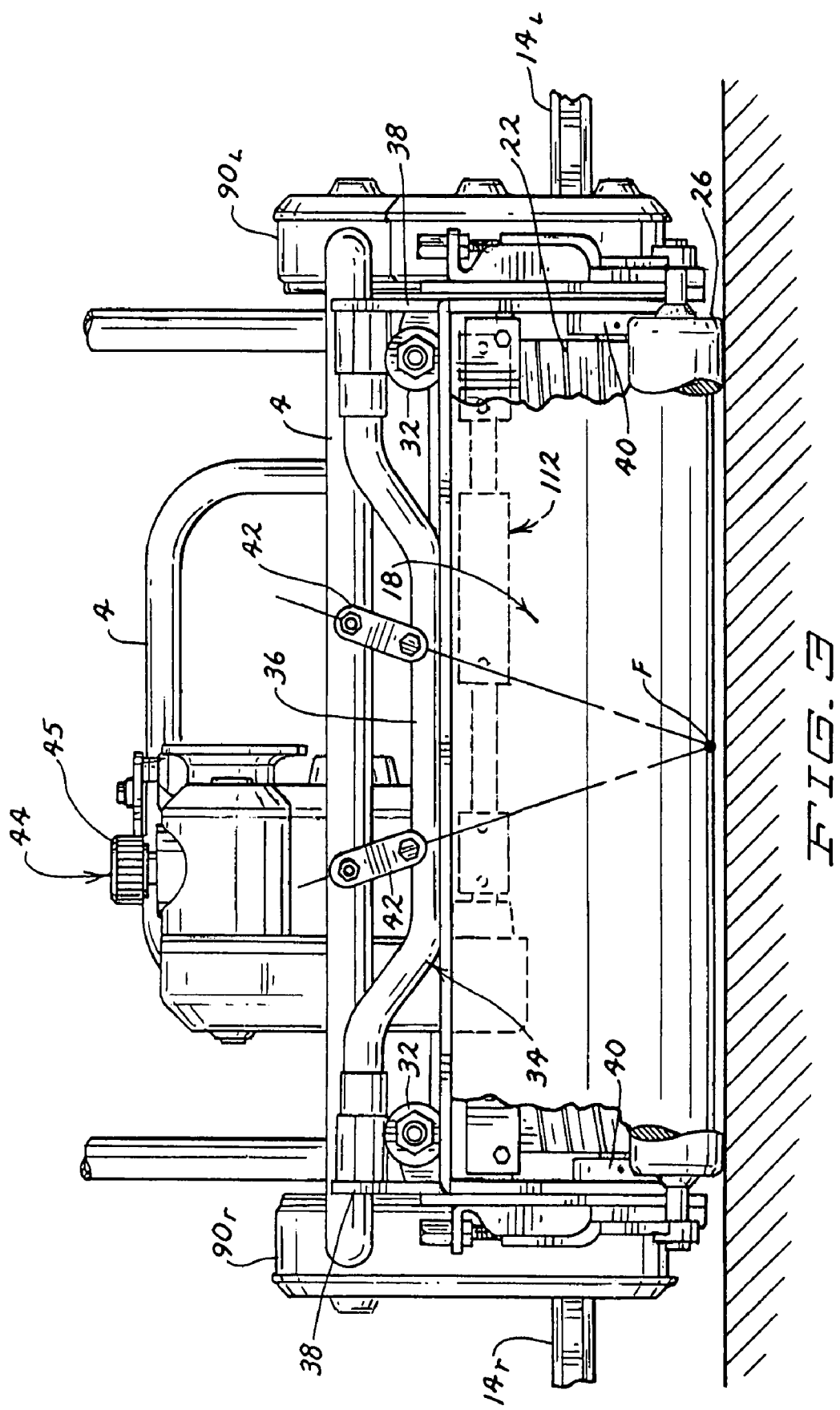
FIG. 3 is a front elevational view of a portion of the walk reel mower shown in FIG. 1, particularly illustrating the reel cutting unit and the focal point F of the rigid links that mount the cutting unit carrier frame to the reel mower frame.

Cutting unit carrier frame 34 is further suspended from reel mower frame 4 by at least one pair of inclined rigid links 42. Referring to FIG. 3, the upper end of each link 42 is pivotally secured to reel mower frame 4 while the lower end of each link 42 is pivotally secured to cross member 36 of cutting unit carrier frame 34. Each link 42 is located offset from the longitudinal centerline of reel cutting unit 18 so that links 42 are on opposite sides of the centerline, i.e. one link 42 is offset to the left of the centerline while the other link 42 is offset to the right of the centerline. Links 42 are further inclined inwardly relative to one another and relative to a vertical line passing through the upper end of each link 42. In other words, the lower end of each link 42 is closer to the longitudinal centerline of reel cutting unit 18 than is the upper end of each link 42.

Accordingly, lines drawn through links 42 will be inclined towards each other and will eventually intersect at a focal point F shown in FIG. 3. Focal point F lies along the longitudinal axis x about which the cutting unit rolls. In addition, focal point F at which the lines of action of links 42 intersect is selected to be at the center of bedknife 24, at least when reel cutting unit 18 is sitting on flat and level ground. This is achieved by controlling the placement and angle of inclination of links 42.

Links 42 are provided in a first pair of links 42 which attach to the front of cross member 36, and in a duplicate second pair of links 42' which attach to the rear of cross member 36. See FIG. 6. Links 42 in the first pair of links are contained in a first transverse plane while links 42' in the second pair of links are contained in a second transverse plane that is offset from the first plane by the thickness of cross member 36. Using two pairs of duplicate links 42, 42' as disclosed herein suspends reel cutting unit 18 in an efficient and durable manner without putting undue stress on any single pair of links.

While a suspension system for reel cutting unit 18 has been shown which comprises a duplicate pair of inclined, rigid links 42, it would be possible to use only a single pair of links 42. In addition, four pivotal links could also be used in an arrangement where each link was located adjacent one corner of reel cutting unit 18 and extended upwardly therefrom to some overlying portion of reel mower frame 4. Each link would again be inclined inwardly to point towards a common focal point F located at the center of bedknife 24.

Figure 7:
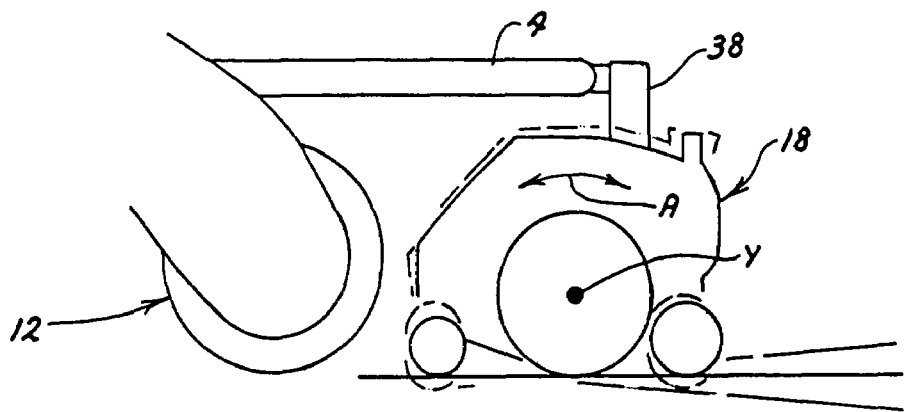
FIG. 7 is a diagrammatic side elevational view of the walk reel mower shown in FIG. 1, particularly illustrating the pitching motion of the reel cutting unit about a substantially horizontal transverse axis.
Figure 8:
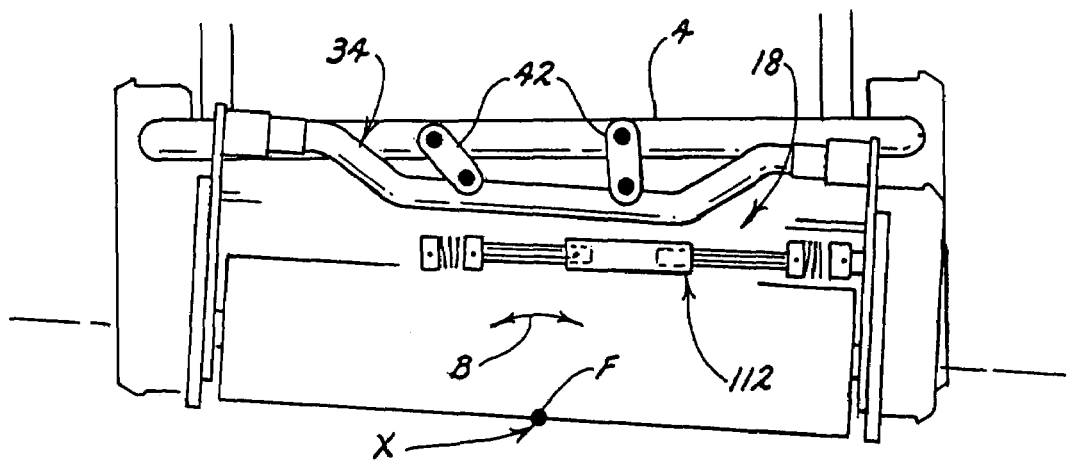
FIGS. 8 and 9 are diagrammatic front elevational views of the walk reel mower shown in FIG. 1, particularly illustrating the rolling motion of the reel cutting unit about a substantially horizontal longitudinal axis.
Figure 9:
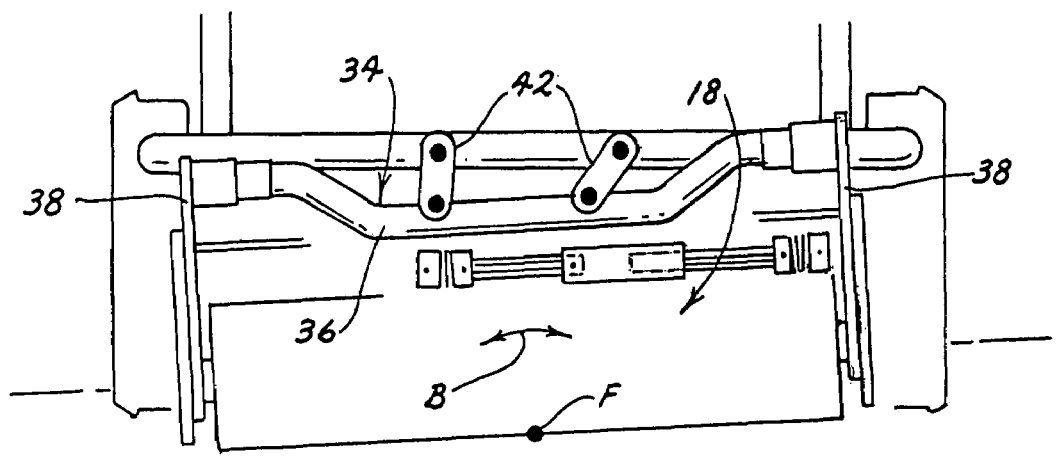

Referring now to FIGS. 7-9, the various permitted motions of reel cutting unit 18 during operation of walk reel mower 2 are illustrated. FIG. 7 shows the pitching motion of reel cutting unit 18 about the transverse axis y, the phantom line positions illustrating the pitching motion. FIGS. 8 and 9 illustrate the rolling motion of reel cutting unit 18 about the longitudinal axis x. The rolling motion is depicted by the arrows B in FIGS. 8 and 9. FIG. 8 illustrates reel cutting unit 18 having rolled to one side while FIG. 9 illustrates reel cutting unit 18 having rolled to the opposite side. Note the pivoting of the pair of transverse links 42 which permits this rolling motion.

The Applicants' have found the use of at least a pair of inwardly, inclined rigid links 42 to support reel cutting unit 18 for rolling motion to be particularly advantageous. Because links 42 point towards a focal point F located at the center of bedknife 24 when reel cutting unit 18 is level, it is as if the entire reel cutting unit 18 is rolling about the longitudinal axis x containing focal point F. Accordingly, scalping or scuffing of the turf is minimized as reel cutting unit 18 rolls.

It is preferred that the focal point F for the rigid suspension links 42 be located at the center of bedknife 24. However, other focal points F could also be used, such as a focal point F located at the surface of or slightly below the surface of the ground. It is desirable that the focal point F be low relative to reel cutting unit 18 and to the ground to minimize turf scalping or scuffing. Using a focal point F at the center of bedknife 24 accomplishes both keeping the focal point low as well as keeping the focal point F longitudinally centered relative to reel cutting unit 18. However, other focal points F could be used although such focal points are desirably kept relatively low with respect to reel cutting unit 18.

One advantage of the suspension system described above is that all "floating movement" of reel cutting unit 18 is achieved by a rigid suspension system, i.e. the rigid links 42 as well as the rigid cutting unit carrier frame 34. Thus, when the operator wishes to tip reel cutting unit 18 up off the ground by pushing downwardly on handle assembly 8 to raise the front end of walk reel mower 2, reel cutting unit 18 will rise immediately without having to take up any slack in flexible chains or the like, as is required in more traditional mowers that often support the reel cutting unit with chains. Thus, the unevenness and jerkiness encountered in prior art walk reel mowers during this operation, i.e. relatively easy lifting until the chains tighten and then the need for a greatly increased force to raise reel cutting unit 18, is avoided. Thus, walk reel mower 2 of this invention has the solid feel and handling of a walk reel mower in which the entire reel cutting unit 18 is rigidly carried on walk reel mower 2, but yet provides much of the floating motion permitted by a chain type suspension system for reel cutting unit 18.

The Integrated Gearbox Providing Traction Drive, Reel Drive, and Parking Brake Another aspect of this invention relates to a greatly simplified gearbox 44 for providing a traction drive 46 for powering traction drum 12 as well as a reel drive 48 for powering cutting reel 22. The clutches used to initiate traction drive 46 and reel drive 48 are all contained within gearbox 44. A differential 54 and much of the speed reduction gearing required for traction drive 46 are contained in gearbox 44 as well. Finally, gearbox 44 includes a parking brake 56. The clutches required to actuate traction drive 46 and parking brake 56 are simple, tightenable band brakes.

Figure 14:
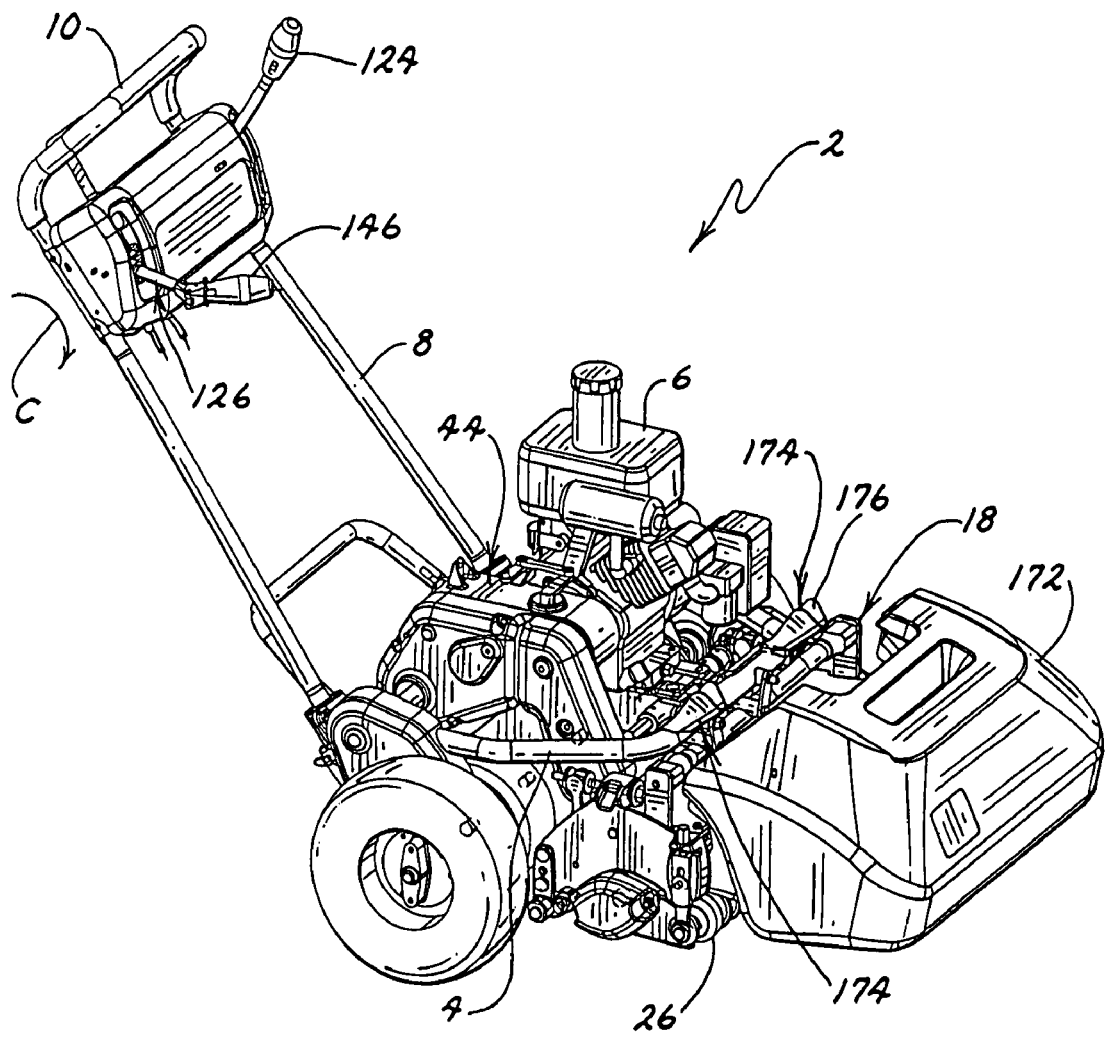
FIG. 14 a perspective view of a second embodiment of a walk reel mower according to this invention, with the grass collecting basket being shown detached from the reel cutting unit in this view and sitting on the ground in advance of the reel cutting unit, this embodiment of the walk reel mower having a single, integrated control handle for controlling both the reel and traction drives and another control handle for actuating the parking brake.

Both of the embodiments shown in FIGS. 1 and 14 use this gearbox 44 with gearbox 44 being generally identical in both embodiments. Gearbox 44 shown in FIG. 1 includes a vent 45 which is not present in gearbox 44 shown in FIG. 14. Other than for this difference, gearboxes 44 shown in FIGS. 1 and 14 are identical.

Figure 10:
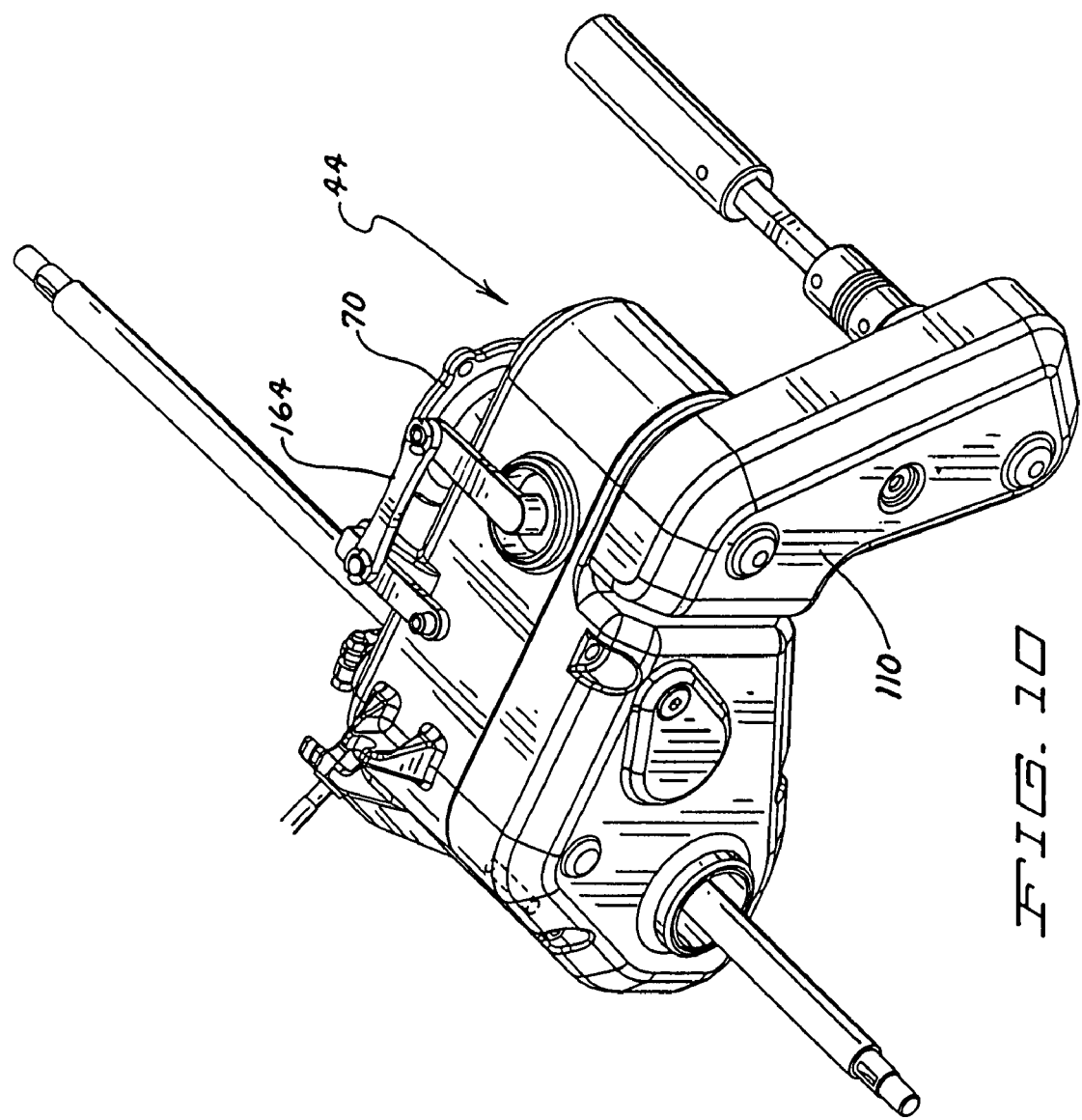
FIG. 10 is a perspective of an integrated gearbox that provides both the traction and reel drives for the walk reel mower shown in FIGS. 1 and 14.
Figure 11:
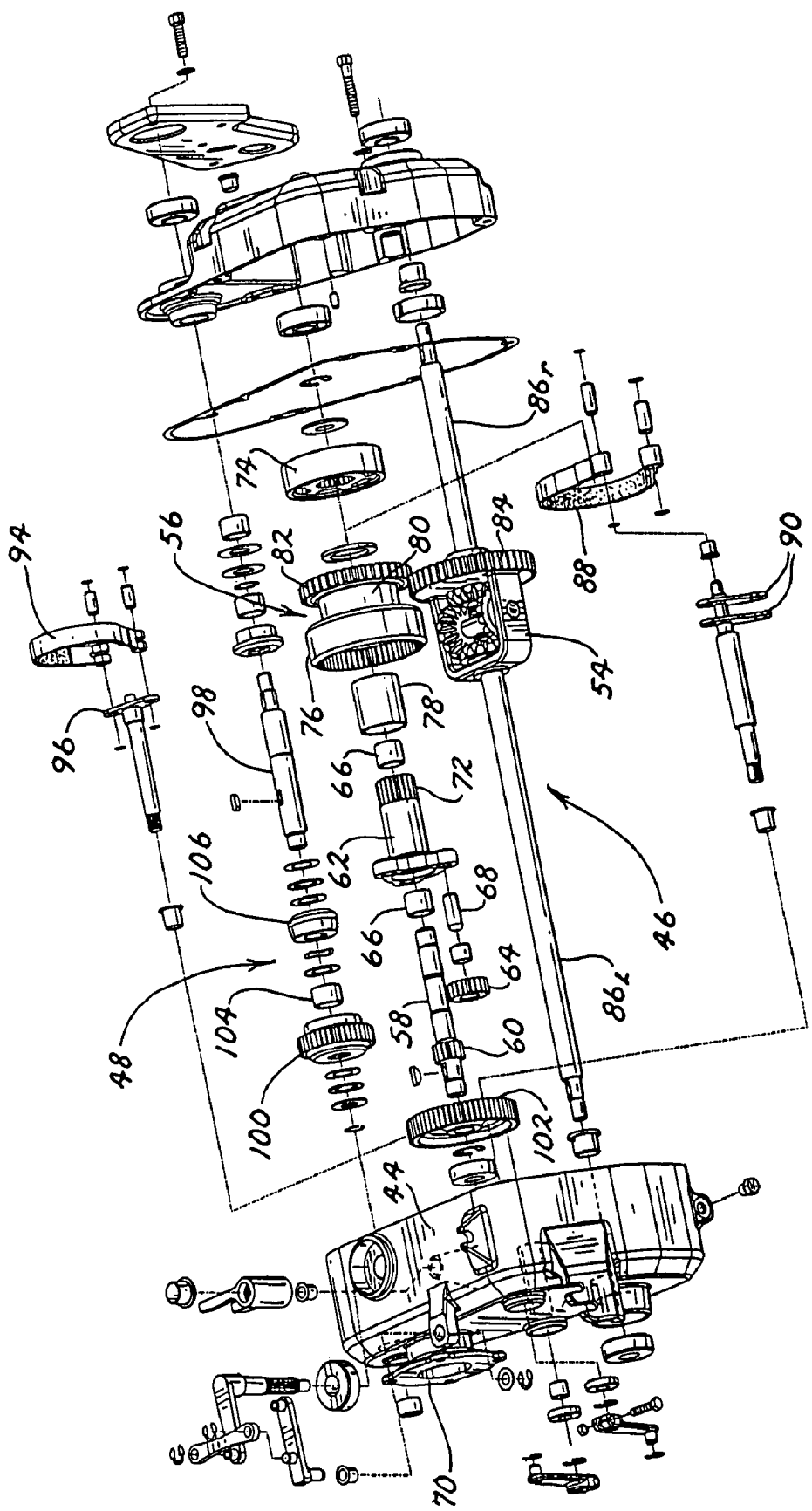
FIG. 11 is an exploded perspective view of the gearbox shown in FIG. 10.

FIG. 10 is a perspective view of the improved gearbox 44 of this invention with gearbox 44 having been removed from walk reel mower 2. FIG. 11 is an exploded perspective view of the improved gearbox 44 of this invention. Gearbox 44 will be described primarily, though not exclusively, with reference to these figures, and mostly with reference to FIG. 11.

Referring now to FIG. 11, gearbox 44 includes a traction drive shaft 58 extending across gearbox 44. A sun gear 60 is carried on traction drive shaft 58. In addition, a planetary gear carrier 62 having a plurality of planetary gears 64 (only one of which is shown in FIG. 11) is rotatably journalled on traction drive shaft 58 by needle bearings 66. There are three planetary gears 64 and each planetary gear 64 is rotatably carried on planetary gear carrier 62 by a pin or dowel 68.

Traction drive shaft 58 is driven from the output shaft of power source 6 by a power source gear (not shown) that extends into gearbox 44 through a housing opening 70. This power source gear is placed between and meshes with a first input gear 102 keyed to traction drive shaft 58 and a second input gear 100 carried on a reel drive shaft 98. Thus, whenever power source 6 is operating, traction drive shaft 58 is rotating, sun gear 60 is rotating, and planetary gears 64 are orbiting around sun gear 60 such that planetary gear carrier 62 is also continuously rotating.

One end of planetary gear carrier 62 includes a gear 72 that is engaged with an internal gear formed in the bore of a traction drive clutch drum 74. Thus, whenever power source 6 is operating, traction drive clutch drum 74 normally rotates with traction drive shaft 58, sun gear 60, planetary gears 64 and planetary gear carrier 62. However, when traction drive clutch drum 74 is rotating, no power is being supplied to traction drum 12.

An internal ring gear 76 is concentrically received around planetary gear carrier 62 and is capable of independent rotation relative to planetary gear carrier 62 since ring gear 76 is supported on a bushing 78 interposed between planetary gear carrier 62 and ring gear 76. Again, when no traction drive is present on traction drum 12 but with power source 6 operating, planetary gears 64 will crawl around the inside of ring gear 76 as planetary gears 64 are rotated, but ring gear 76 will itself remain stationary.

Ring gear 76 includes a parking brake clutch drum 80 and a traction drive gear 82 affixed thereto or made integral therewith. Traction drive gear 82 is connected to the input gear 84 of a generally conventional differential 54. Differential 54 includes first and second output shafts 86*l* and 86*r* which are adapted to independently drive traction drum halves 12*l* and 12*r*. Differential 54 can be a Peerless differential, Model No. 100-207.

In order to transmit drive to traction drum 12, a traction band brake 88 is located around traction drive clutch drum 74. Normally, traction band brake 88 is in a loosened state. However, when various controls on handle assembly 8 are manipulated, as will be described hereafter, traction band brake 88 can be tightened around traction drive clutch drum 74 by rotating a lever arm 90, to which the ends of traction band brake 88 are connected as illustrated at 92. This rotating action of lever arm 90 moves one end of traction band brake 88 relative to the other end of traction band brake 88 to tighten traction band brake 88 around traction drive clutch drum 74.

When traction band brake 88 is so tightened, rotation of traction drive clutch drum 74 and of planetary gear carrier 62 is stopped. However, traction drive shaft 58, sun gear 60, and planetary gears 64 are all still rotating. The rotation of planetary gears 64 is now transmitted to ring gear 76 to rotate ring gear 76 and hence rotate traction drive gear 82 that is fixed to ring gear 76. This, in turn, transmits the drive through differential 54 to the output shafts 86*l* and 86*r* of differential 54.

The outer end of each differential output shaft 86*l* and 86*r* is located outside gearbox 44 where it is connected by an enclosed belt or chain drive 90*l* and 90*r* to one of the shafts 14*l* and 14*r* for one of traction drum halves 12*l* and 12*r*. Thus, whenever traction band brake 88 is selectively tightened by the operator while power source 6 of walk reel mower 2 is operating, drive from power source 6 will be transmitted through the drive reduction provided by the planetary gearing and ring gear, through differential 54, and through the individual belt or chain drives 90*l* and 90*r* to the shafts 14*l* and 14*r* of traction drum halves 12*l* and 12*r*.

Much of the drive reduction needed for traction drum halves 12*l* and 12*r* is accomplished by the reduction provided within gearbox 44 itself. However, some reduction also occurs within the belt or chain drives 90*l* and 90*r* which connect the differential output shafts with the shafts for traction drum halves 12*l* and 12*r*. This reduction within the belt or chain drives 90*l* and 90*r* is provided by sizing the input and output pulleys or sprockets differently from one another to further reduce the speed of the differential output shafts. However, if so desired, a planetary gear drive could be provided within gearbox 44 having multiple planetary stages such that the planetary gear drive itself provides substantially all of the desired drive reduction.

A parking brake 56 for walk reel mower 2 is conveniently and simply formed by the parking brake clutch drum 80 fixed to or formed with ring gear 76 along with a second, parking band brake 94 included within gearbox 44. Parking band brake 94 can be tightened in much the same manner as traction band brake 88, i.e. by pivoting a lever arm 96 to pull one end of the band brake relative to the other end of the band brake in a direction that tightens the band brake around the clutch drum. This is done by any suitable operational control provided on walk reel mower 2 and any suitable linkage for providing rotation of lever arm 96.

When the parking brake control is actuated and parking band brake 94 is tightened, parking band brake 94 grips parking brake clutch drum 80 secured to ring gear 76 with sufficient force to hold ring gear 76 against rotation caused by walk reel mower 2 rolling down a typical incline found on a golf course or the like. This gripping force is chosen to hold walk reel mower 2 in place assuming traction drive 46 is not operating. If traction drive 46 is operating, parking band brake 94 will not provide sufficient force to hold ring gear 76 as the force provided by parking band brake 94 will be overpowered by the force of traction drive 46 on ring gear 76. However, parking brake 56 is only intended to be used when traction drive 46 is disengaged and no traction force is being transmitted to ring gear 76. In this case, the gripping force provided by parking band brake 94 is sufficient to hold ring gear 76 against any rotation which might be induced by walk reel mower 2 rolling down an incline, thus keeping walk reel mower 2 stationary against unintended movement.

The same gearbox 44 which provides a traction drive 46 for traction drum 12 and a parking brake 56 for walk reel mower 2 also provides a reel drive 48 for cutting reel 22. This reel drive 48 will now be described, again with reference to the exploded perspective view of FIG. 11.

A reel drive shaft 98 is rotatably journalled in gearbox 44 and is parallel to traction drive shaft 58. Reel drive shaft 98 includes an input gear 100 which is continuously rotated whenever power source 6 is operating. This input gear 100 is continuously rotated by the same power source gear (not shown) that is driven by the engine, this power source gear mating with and driving both input gears 100 and 102. Thus, when power source 6 is operating and the power source gear (not shown) contained in gearbox 44 is rotating, the engagement between this power source gear and input gear 100 on reel drive shaft 98 causes input gear 100 on reel drive shaft 98 to be continuously rotated.

Figure 12:
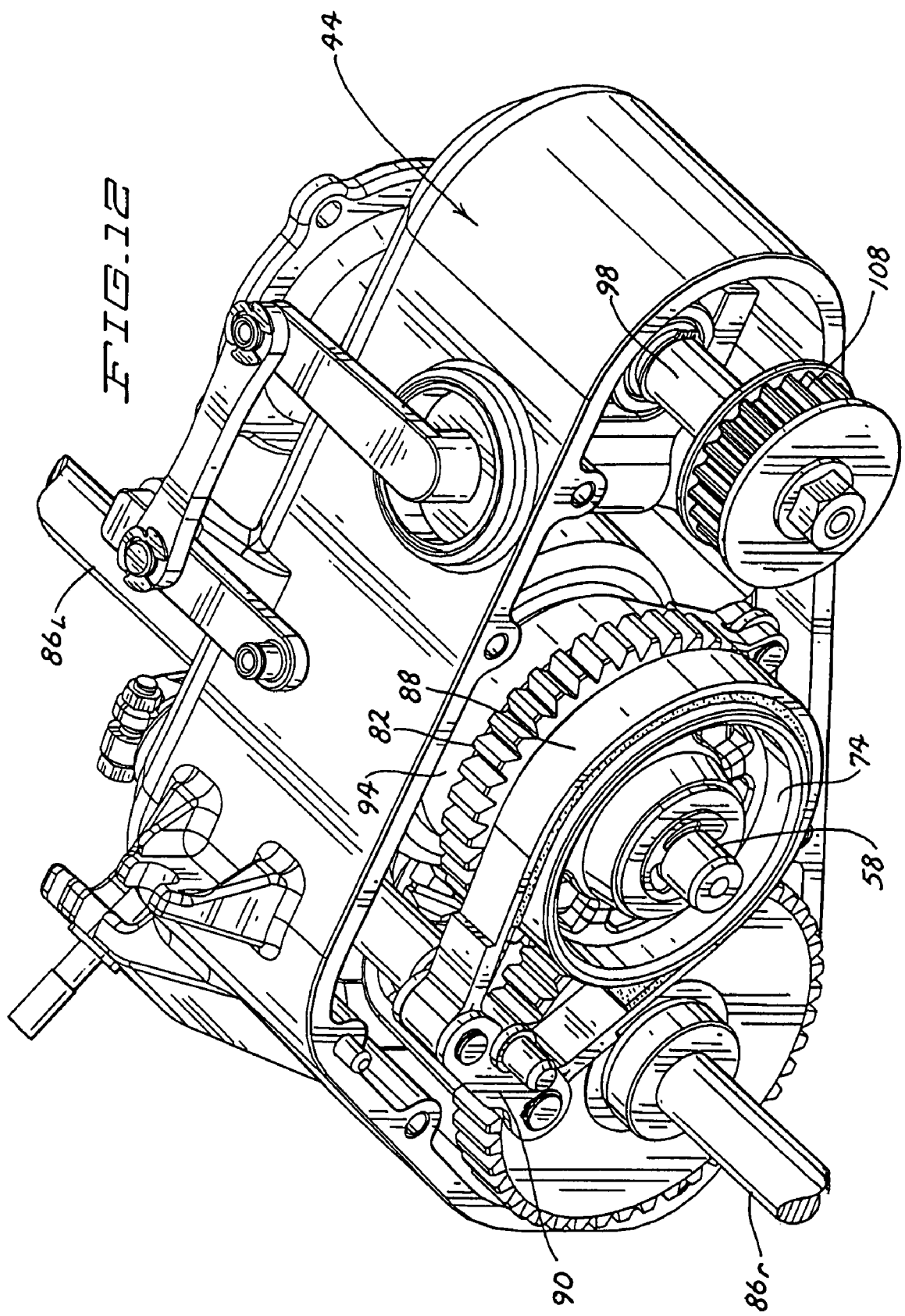
FIG. 12 is an enlarged perspective view of the gearbox shown in FIG. 10, but with the side covers of the gearbox having been removed to illustrate the interior of the gearbox and particularly to illustrate the traction drive clutch drum, the drive gear interconnecting the ring gear and the input gear of the differential, the traction drive band brake surrounding the traction drive clutch drum, and the output gear on the cutting reel drive shaft.
Figure 13:
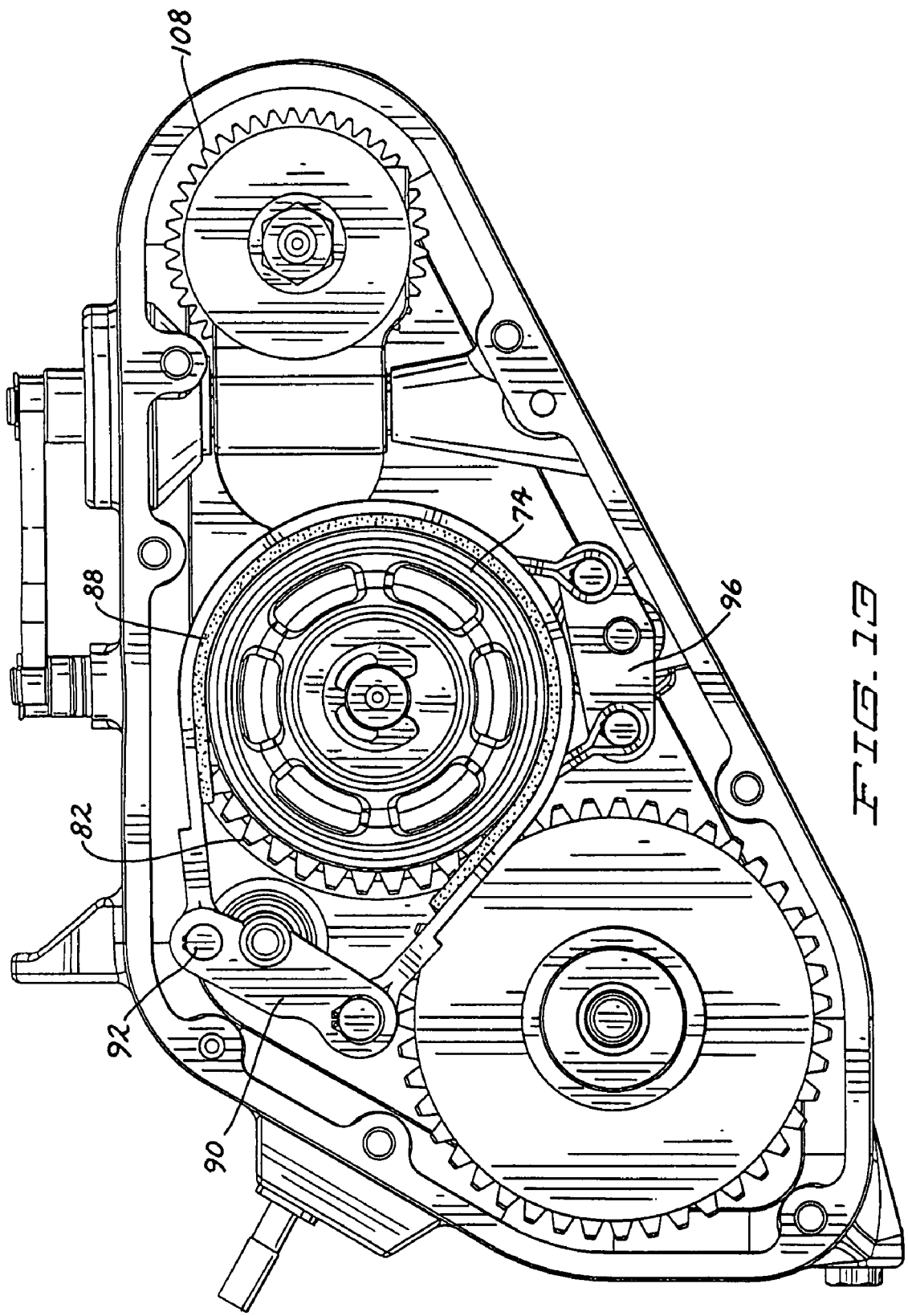
FIG. 13 is an enlarged side elevational view of the gearbox shown in FIG. 10, with FIG. 13 being similar to FIG. 12 in that the side covers of the gearbox have been removed to illustrate the interior of the gearbox to thereby illustrate the same components as are shown in FIG. 12.

Input gear 100 on reel drive shaft 98 does not continuously rotate reel drive shaft 98 as it is supported on reel drive shaft 98 by a bearing 104. Thus, input gear 100 on reel drive shaft 98 can rotate while reel drive shaft 98 is stationary. The operator can selectively place reel drive shaft 98 into operation by operating a control on walk reel mower 2, which control will be described in more detail hereafter, to slide a cone clutch 106 into engagement with input gear 100 on reel drive shaft 98. Cone clutch 106 is slidably, but non-rotatably affixed, to reel drive shaft 98. Thus, when cone clutch 106 is slid along reel drive shaft 98 and into engagement with input gear 100, cone clutch 106 will transmit the drive from input gear 100 to reel drive shaft 98 to begin rotating reel drive shaft 98. Reel drive shaft 98 includes an output gear 108 on the other end thereof from which the drive for cutting reel 22 may be taken. This output gear 108 is not shown in FIG. 11, but is shown in FIGS. 12 and 13.

The integrated gearbox 44 disclosed herein has many advantages. It conveniently locates both the traction and reel drives 46 and 48 within a single gearbox. This avoids the cluttered look of prior art walk reel mowers many of which use separate gearboxes for these drives. It also locates the clutches 88 and 106 for controlling or actuating the traction and reel drives 46 and 48 within a single gearbox. Since gearbox 44 can be lubricated with oil, both the traction and reel drives 46 and 48 will be kept lubricated together, without having to keep separate gearboxes lubricated.

In addition, considering just traction drive 46 alone, the single gearbox 44 houses both a planetary gear reduction drive as well as differential 54. This avoids having to place differential 54 in traction drum 12 itself, as in older walk reel mower designs. In addition, the clutch 88 for initiating traction drive 46 is a simple band brake which is tightened around traction drive clutch drum 74 to cause the drive of planetary gears 64 to be transmitted up through ring gear 76 rather than to planetary gear carrier 62. Thus, traction drive 46 is compact, simple and durable. Accordingly, traction drive is transmitted to traction drum 12 in a highly efficient and easy to operate manner.

Moreover, as previously described, a parking brake 56 is easily incorporated into the unit by forming another clutch drum 80 with ring gear 76 and using a second band brake 94 to grip this clutch drum. Again, this is a compact, simple and durable structure.

The Flexible, Self-Lubricating Drive Shaft Driving Cutting Reel 22

The output gear 108 located on reel drive shaft 98 is coupled to cutting reel 22 through a first belt or chain drive 110 that extends downwardly from gearbox 44 to a point above reel cutting unit 18. This first belt or chain drive 110 is preferably arranged to provide a 1 to 1 drive, but other than a 1 to 1 drive could be used. This first belt or chain drive 110 is located generally over reel cutting unit 18 due to the location of gearbox 44. Thus, it is necessary to transfer drive from the lower end of first belt or chain drive 110 over to one side of reel cutting unit 18 and then down to the shaft of cutting reel 22. The drive must be transferred and kept in proper operation even though reel cutting unit 18 can float or move relative to reel mower frame 4 through motion with respect to two axes, i.e. the x and y axes described above.

Figure 6:
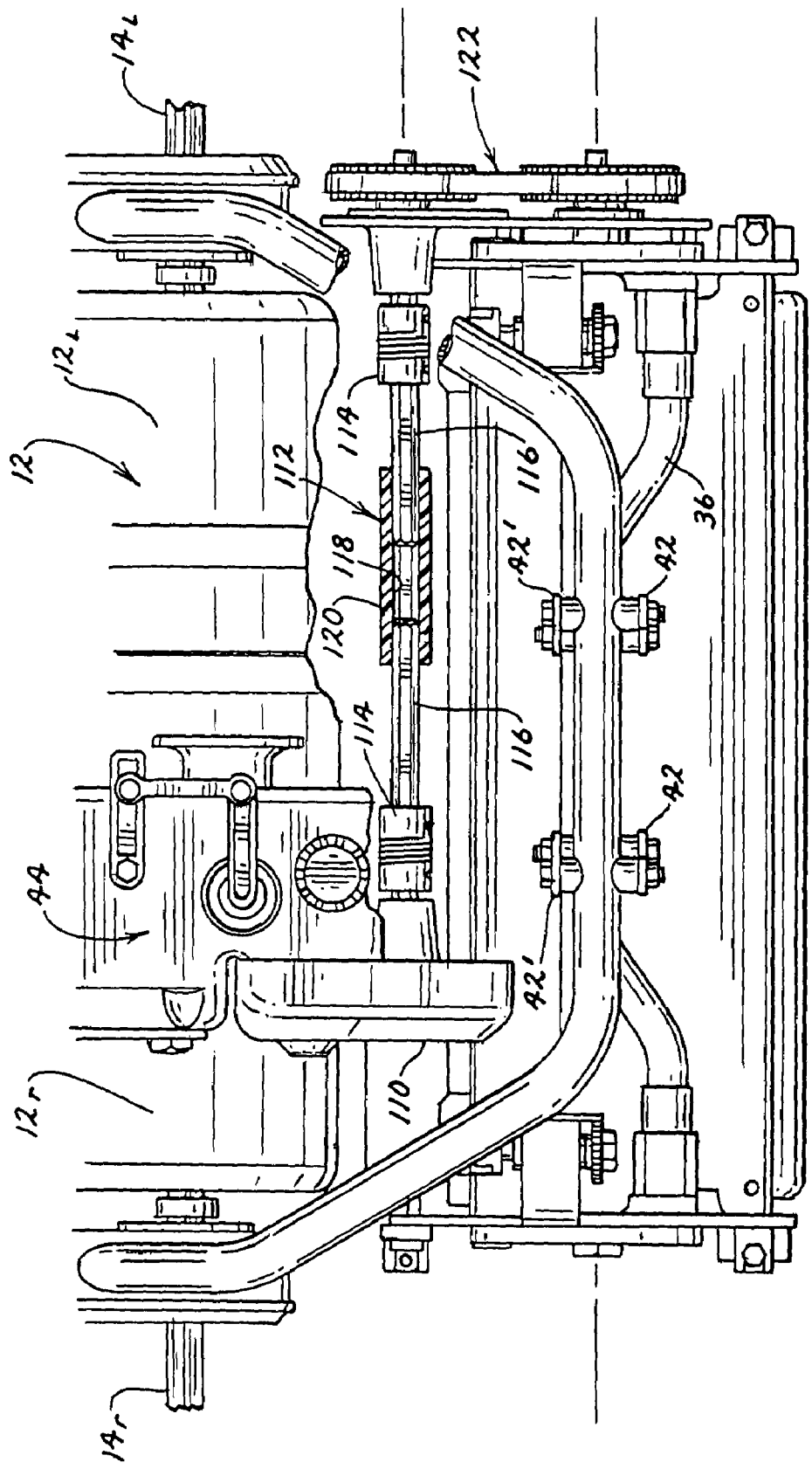
FIG. 6 is a top plan view of a portion of the walk reel mower shown in FIG. 1, particularly illustrating the self-lubricating drive shaft that transfers drive from the gearbox located on the reel mower frame to the cutting reel.

Referring now to FIG. 6, the drive is transferred from the first belt or chain drive 110 that extends downwardly from gearbox 44 by a transversely extending drive shaft 112 arranged above reel cutting unit 18. Drive shaft 112 comprises flexible joints 114 at either end, in the nature of universal couplings, which are formed from a solid piece of stainless steel material having a spiral slot or groove formed therein. Similar joints are commercially available from Helical Products of Santa Maria, Calif. The joints are referred to by Helical Products as flexible helix beam couplers.

A stub shaft 116 is secured to each joint and extends inwardly so that stub shafts 116 on the opposed joints 114 point towards one another, not away from one another. Each stub shaft 116 has a non-circular cross-sectional configuration. In other words, each stub shaft 116 has an outer periphery in the form of a square or hex shape or the like. Each stub shaft 116 is received within the interior bore 118 of an intermediate coupler 120. Bore 118 of intermediate coupler 120 is shaped to mate with the cross-sectional configuration of stub shafts 116. Thus, if stub shafts 116 have a hex head configuration, bore 18 will have a hex head configuration as well.

As should be apparent, each stub shaft 116 is slidably received within intermediate coupler 120 so that stub shafts 116 can move in and out relative to intermediate coupler 120 as reel cutting unit 18 rolls about the x axis. Stub shafts 116 and intermediate coupler 120 are designed so that stub shafts 116 never come out of intermediate coupler 120 as reel cutting unit 18 rolls during operation of walk reel mower 2 as this would disrupt the drive provided by drive shaft 112. Stub shafts 116 are merely able to slide back and forth within intermediate coupler 120 to accommodate the maximum permissible amount of rolling motion without ever disengaging intermediate coupler 120. As intermediate coupler 120 and stub shaft 116 nearest the first belt or chain drive 110 from gearbox 44 rotate, this rotation will be transmitted through intermediate coupler 120 to stub shaft 116 adjacent the left side of reel cutting unit 18. From that point, the drive can be transferred to the shaft of cutting reel 22 by a second 1 to 1 belt or chain drive 122. See FIG. 5.

Desirably, joints 114 as well as intermediate coupler 120 are made from materials which do not require external lubrication. For example, coupler 120 is made from a nylon material impregnated with a non-oil based lubricant, such as molybdenum disulfide. This material provide its own lubrication without requiring the material to be immersed or bathed with oil. Using such self-lubricating materials in drive shaft 112 is an advantage in a walk reel mower as there is no possibility of an oil leak that might damage the grass. Thus, drive shaft 112 disclosed herein is an efficient and environmentally friendly structure for driving cutting reel 22 from gearbox 44, even though reel cutting unit 18 can itself pitch and roll relative to gearbox 44.

Drive shaft 112 could also be used on reel mowers carried on or formed as part of riding mowers.

The Operational Controls

Another aspect of this invention relates to the operational controls for walk reel mower 2. Referring to FIG. 14, a first pivotal control handle 124 is carried on handle assembly 8 of walk reel mower 2 on one of the handle tubes. This first control handle 124 actuates parking brake 56. When first control handle 124 is pivoted from one position to another, a control linkage is pulled which causes the rotation of lever arm 96 for parking band brake 94. This causes parking band brake 94 to tighten on parking brake clutch drum 80 to prevent ring gear 76 from turning during non-powered, inadvertent movement of walk reel mower 2, such as when walk reel mower 2 might roll down an incline. Movement of first control handle 124 back to its normal position will loosen parking band brake 94 and release parking brake 56.

Normally, when first control handle 124 is pivoted downwardly and forwardly relative to handle assembly 8, parking brake 56 is not actuated. When first control handle 124 is pivoted rearwardly and upwardly relative to handle assembly 8, parking brake 56 is actuated. The position of first control handle 124 in FIG. 14 illustrates the position in which parking brake 56 is actuated.

A single, second control handle 126 is provided for operating both traction drive 46 and cutting reel 22. This is particularly advantageous and an improvement over prior art walk reel mowers. Second control handle 126 is shown in detail in FIGS. 15 and 16.

A control housing 128 is secured to that handle tube which does not mount first control handle 124. A semicircular sleeve 130 is provided for being received around the handle tube for attaching control housing 128 to the handle tube. A substantially horizontal, fixed pivot pin 132 extends through one side wall of control housing 128 and is received in an aligned bore 133 in an intermediate wall in control housing 128. This pivot pin 132 serves as a fixed pivot axis for second control handle 126.

Figure 16:
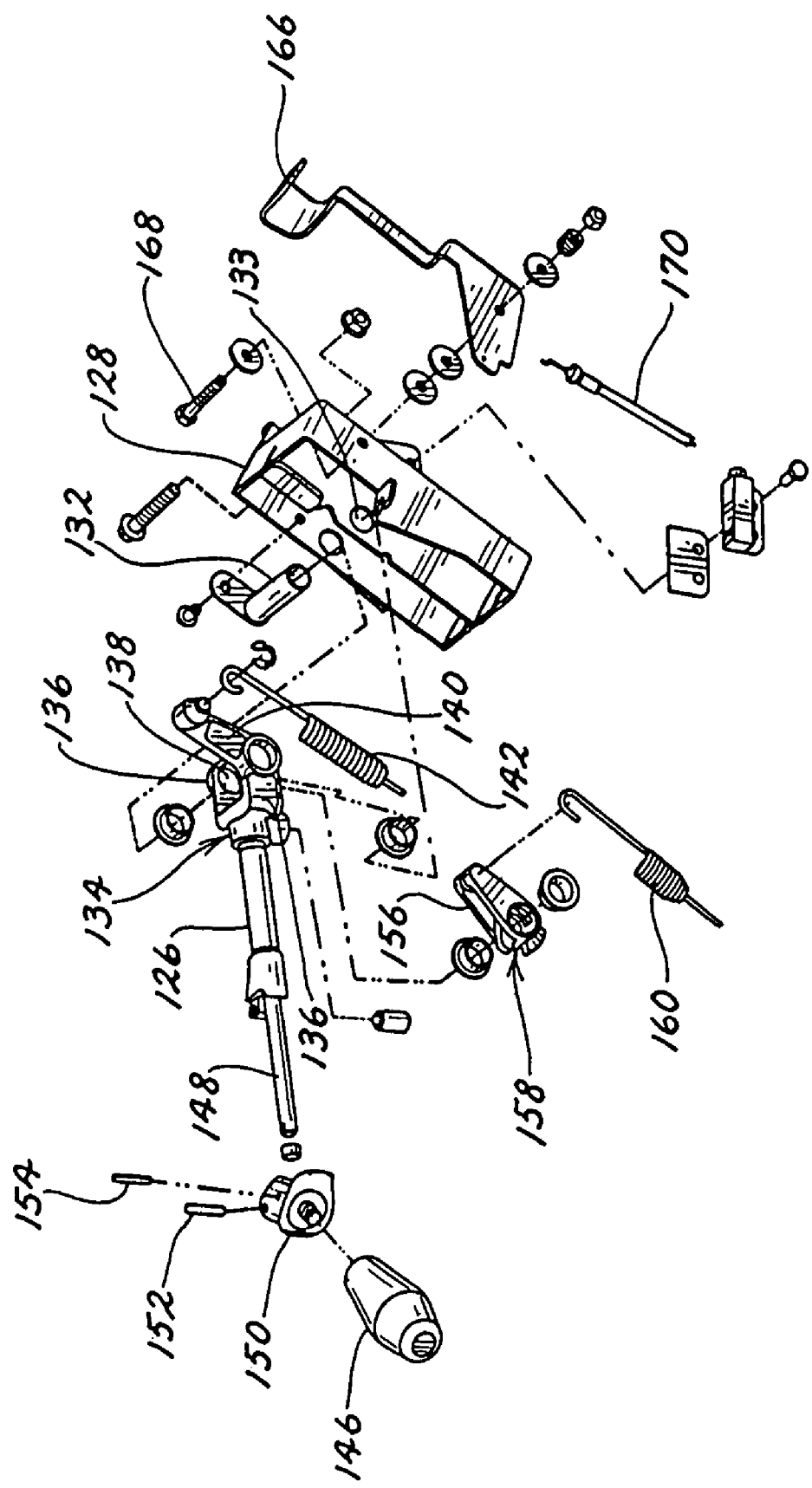
FIG. 16 is an exploded perspective view of the single, integrated control handle shown in FIG. 14 for controlling both the reel and traction drives.

Second control handle 126 is pivotally mounted on fixed pivot pin 132 so as to rotate around fixed pivot pin 132. The lower end of second control handle 126 has a yoke 134. As shown in FIG. 16, yoke 134 has spaced legs 136 which have openings 138 for journalling second control handle 126 on fixed pivot pin 132. Yoke 134 includes a radially extending arm 140 that is attached to one end of a spring 142. The other end of spring 142 is attached to a cable or linkage 144 which actuates lever arm 90 on traction band brake 88 to actuate traction drive 46.

Pivoting second control handle 126 downwardly about the pivot axis formed by fixed pivot pin 132, i.e. in the direction of the arrow C in FIG. 14, pulls upwardly through spring 142 on cable 144 that actuates lever arm 90 on traction band brake 88. This causes traction band brake 88 to be tightened. Tightening traction band brake 88 stops or locks up planetary gear carrier 62. In turn, this allows planetary gears 64 to rotate ring gear 76. Thus, rotating second control handle 126 downwardly and forwardly places walk reel mower 2 into movement by actuating traction drive 46. Second control handle 126 is shown in FIG. 14 in a position in which traction drive 46 is engaged.

Second control handle 126 further includes a selectively operable toggle member 146 on the top thereof for actuating cutting reel 22. When toggle member 146 is located coaxially in line with second control handle 126, cutting reel 22 is stationary. However, if the user first toggles the toggle member 146 to one side of second control handle 126, so that toggle member 146 is now inclined relative to the axis of second control handle 126, cutting reel 22 will be placed in operation when second control handle 126 is pivoted in a direction that also engages traction drive 46.

A reciprocal rod 148 is located inside second control handle 126 which rod 148 is moved up and down relative to second control handle 126 when toggle member 146 is toggled. The bottom of toggle member 146 is pivotally mounted to second control handle 126 by a toggle base 150 that rotates about a transversely offset pivot pin 152. Toggle base 150 is also pinned at 154 to the top of reciprocal rod 148. When toggle member 146 is coaxially aligned with second control handle 126, the pinned connection 154 to reciprocal rod 148 is raised above the offset pivot pin 152, thereby drawing reciprocal rod 148 upwardly relative to second control handle 126. When toggle member 146 is toggled to one side relative to second control handle 126 as shown in FIGS. 14-16, so that the co-axial relationship between toggle member 146 and second control handle 126 is no longer present, the pinned connection 154 to reciprocal rod 148 is now lowered relative to the offset pivot pin 152 to be at about the same level as the offset pivot pin 152, thereby pushing reciprocal rod 148 downwardly relative to second control handle 126.

A pivotal coupling link 156 is pivotally mounted on fixed pivot pin 132 in control housing 128 between the spaced legs 136 of yoke 134 in a position underlying the lower end of second control handle 126. This pivotal coupling link 156 includes a notch 158 in one side that is sized to receive the lower end of reciprocal rod 148 in second control handle 126. Pivotal coupling link 156 is independently rotatable relative to second control handle 126, i.e. pivotal coupling link 156 does not necessarily rotate with second control handle 126 when second control handle 126 rotates. It only rotates with second control handle 126 when the lower end of reciprocal rod 148 in second control handle 126 is lowered into notch 158 on pivotal coupling link 156.

Pivotal coupling link 156 is further secured to one end of a spring 160. The other end of this spring 160 is attached to a cable or linkage 162 which actuates cone clutch 106 on reel drive shaft 98 to actuate cutting reel 22. Pulling upwardly on this cable 162 rotates a bell crank linkage 164 on top of gearbox 44, which bell crank linkage 164 is connected in some fashion to cone clutch 106, to slide cone clutch 106 back and forth on reel drive shaft 98.

Figure 15:
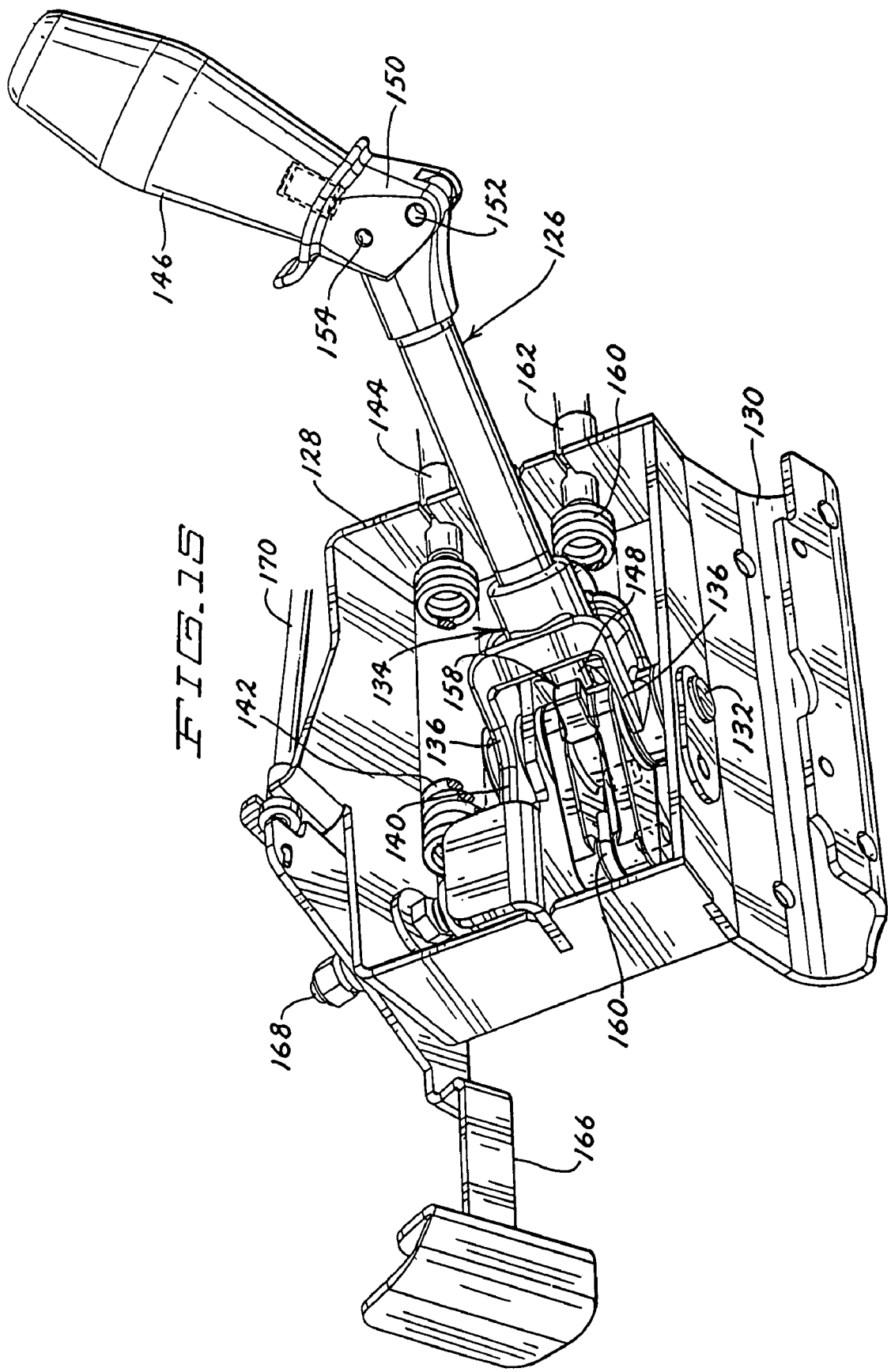
FIG. 15 is a perspective view of the single, integrated control handle shown in FIG. 14 for controlling both the reel and traction drives.

When toggle member 146 is toggled to the side as shown in FIGS. 14-16, reciprocal rod 148 is moved down such that the lower end of reciprocal rod 148 enters into notch 158 in coupling link 156. When the lower end of reciprocal rod 148 enters into notch 158, coupling link 156 is now coupled to second control handle 126 for joint rotation therewith. Thus, rotating second control handle 126 to actuate traction drive 46 will also cause cutting reel 22 to be placed into operation. If the operator does not toggle the toggle member 146 to the side before rotating second control handle 126, such that reciprocal rod 148 remains in a raised position relative to second control handle 126 with the lower end of reciprocal rod 148 being out of engagement with notch 158 in coupling link 156, then only traction drive 46 is engaged, with cutting reel 22 remaining stationary.

The integrated traction drive/cutting reel control handle 126 is advantageous over prior art walk reel mowers in which two separate control handles are sometimes provided or in which the cutting reel control handle is located down on reel mower frame 4. In this latter situation, the operator must walk around from behind handle assembly 8 to actuate and deactuate cutting reel 22. This can be onerous and time-consuming to do. With the single second control handle 126 disclosed herein, the operator can separately engage and disengage cutting reel 22 from behind handle assembly 8 without leaving the normal operating position.

The advantages in this are best explained in reference to the use of a walk reel mower of this type in cutting golf greens or the like. When cutting a number of such greens, the operator will first cut one green. Following the cutting of one green, the operator will the drive walk reel mower 2 to the next green. When making the trip to the next green, it is desirable that cutting reel 22 be disengaged and only traction drive 46 be engaged.

However, as a practical manner, many operators do not disengage cutting reel 22 during such a trip because they have to leave the operator's position to reach the control handle or lever which controls cutting reel 22, such control handle or lever normally being present on reel mower frame 4 in front of handle assembly 8. To disengage cutting reel 22, the operator first has to disengage traction drive 46, walk around in front of handle assembly 8 to disengage cutting reel 22, then walk back behind handle assembly 8 to re-engage traction drive 46 to allow walk reel mower 2 to be driven to the next green. When the next green is reached, this procedure has to be repeated. Namely, to now engage cutting reel 22, the operator again has to disengage traction drive 46, walk around in front of handle assembly 8 to now re-engage cutting reel 22, and then walk back behind handle assembly 8 to re-engage traction drive 46.

This procedure is so onerous and bothersome to many operators that such operators simply don't take the time to disengage cutting reel 22 when driving walk reel mower 2 from one location to another. Instead, they simply let cutting reel 22 remain powered and tip walk reel mower 2 back on its traction drum 12 to keep reel cutting unit 18 raised during transport. This is disadvantageous as additional wear and tear is placed on reel cutting unit 18 because it is operating at times when it need not. In addition, it is tiring to the operator to keep reel cutting unit 18 elevated off the ground during transport.

By contrast, the single control handle 126 of this invention allows the operator to disengage cutting reel 22 with the flick of a wrist and on the fly while traction drive 46 remains engaged. All the operator needs to do is to toggle the toggle member 146 back to its upright, in line position with second control handle 126 and reciprocal rod 148 will leave notch 158 in coupling link 156. The spring 160 will then cause coupling link 156 to return to its unactuated position and the actuating cable 162 will return to its position in which cone clutch 106 is disengaged. However, traction drive 46 remains engaged. Thus, at the end of one mowing operation, walk reel mower 2 of this invention can be easily driven to another location with cutting reel 22 being disengaged simply by flicking toggle member 146 to its upright position.

When a new mowing location is reached, the operator must disengage traction drive 46 before re-engaging cutting reel 22. But, with the second control handle 126 disclosed herein, this is easily done simply by rotating second control handle 126 rearwardly and upwardly on handle assembly 8 to its normal unactuated position. Then, both traction drive 46 and cutting reel can be easily re-engaged by first toggling the toggle member 146 to one side to push reciprocal rod 148 into notch 158 in coupling link 156 and by then pivoting second control handle 126 downwardly and forwardly in the slot in which second control handle 126 is received. This can be done quickly and while the operator stays in the normal operational position in back of handle assembly 8.

If desired, a pivotal throttle 166 can be pivotally supported on another pivot pin 168 carried on the same control housing 128 that mounts second control handle 126. This throttle 166 is connected by an actuating cable 170 to the throttle on power source 6 to allow the operator to increase or decrease the power provided by power source 6. Placing throttle 166 on this control housing so that throttle 166 is adjacent second control handle 126 groups all the controls together that relate to the actuation and control of the powered components on walk reel mower 2.

Obviously, the actuated/not actuated positions of the first and second control handles 124 and 126 could be reversed if so desired.

The Basket Mounting

In many prior art walk reel mowers of this type, the grass basket 172 is carried on reel mower frame 4 by upwardly and forwardly inclined cylindrical pins provided at two, transversely spaced locations on the front of reel mower frame 4. The grass basket includes a rearwardly and downwardly inclined seating groove on each side thereof for receiving one of these pins. The operator can pull the grass basket off reel mower frame 4 by pulling up and forwardly on the grass basket to remove the seating grooves from the pins.

One difficulty with this known seating groove/pin arrangement is that certain manipulation of walk reel mower 2 can cause the pins to inadvertently disengage the grooves. For example, this sometimes happens when the operator lifts upwardly on the rear of the reel mower. If the operator lifts high enough, and if the front of the grass basket is loaded with grass clippings, the pins can be forced out of the grooves and the grass basket will become disengaged. This forces the operator to walk around and reconnect the grass basket to reel mower frame 4.

Figure 17:
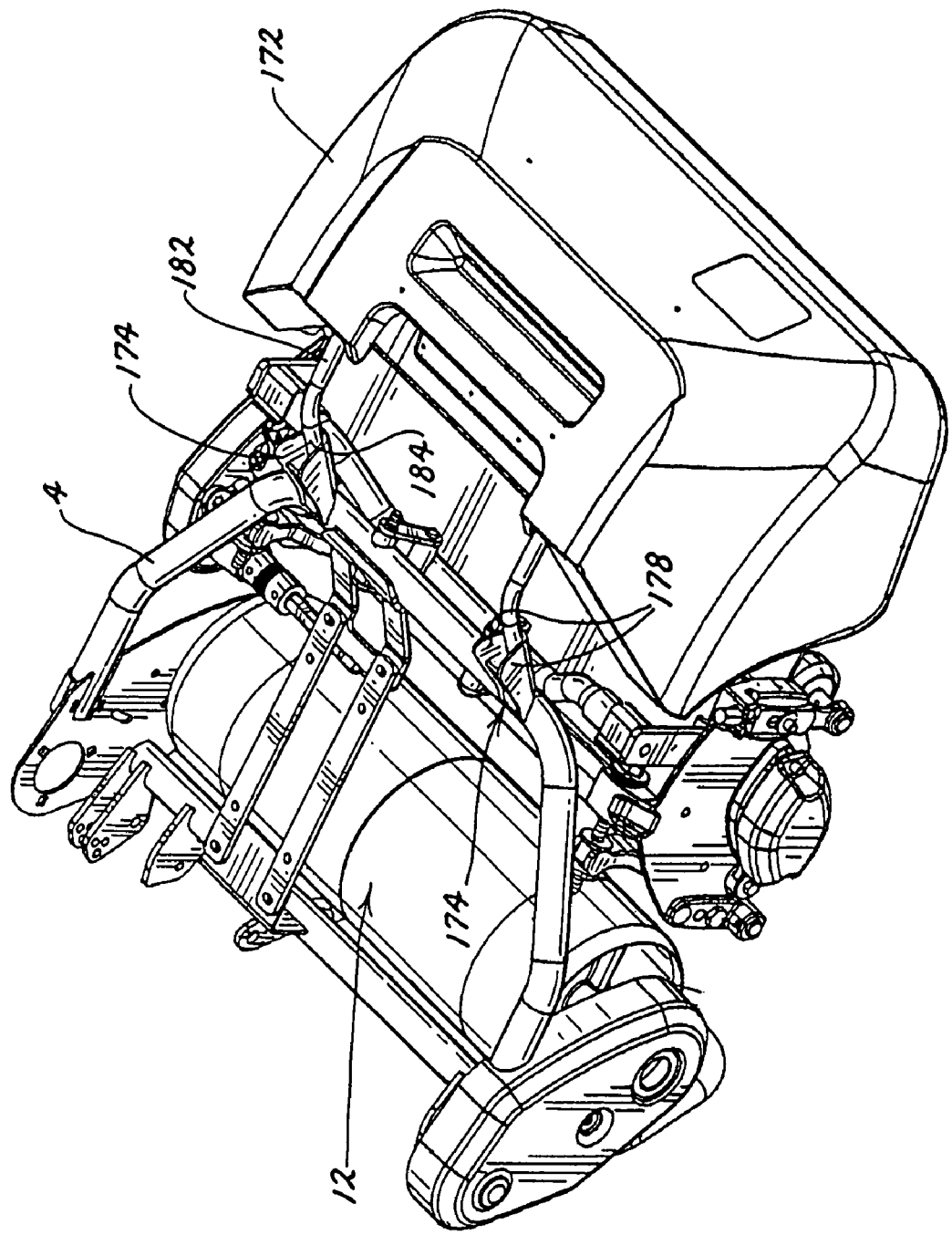
FIG. 17 is a perspective view of a portion of the walk reel mower shown in FIG. 14, particularly illustrating the mounting on the reel mower frame for supporting the grass collecting basket.
Figure 18:
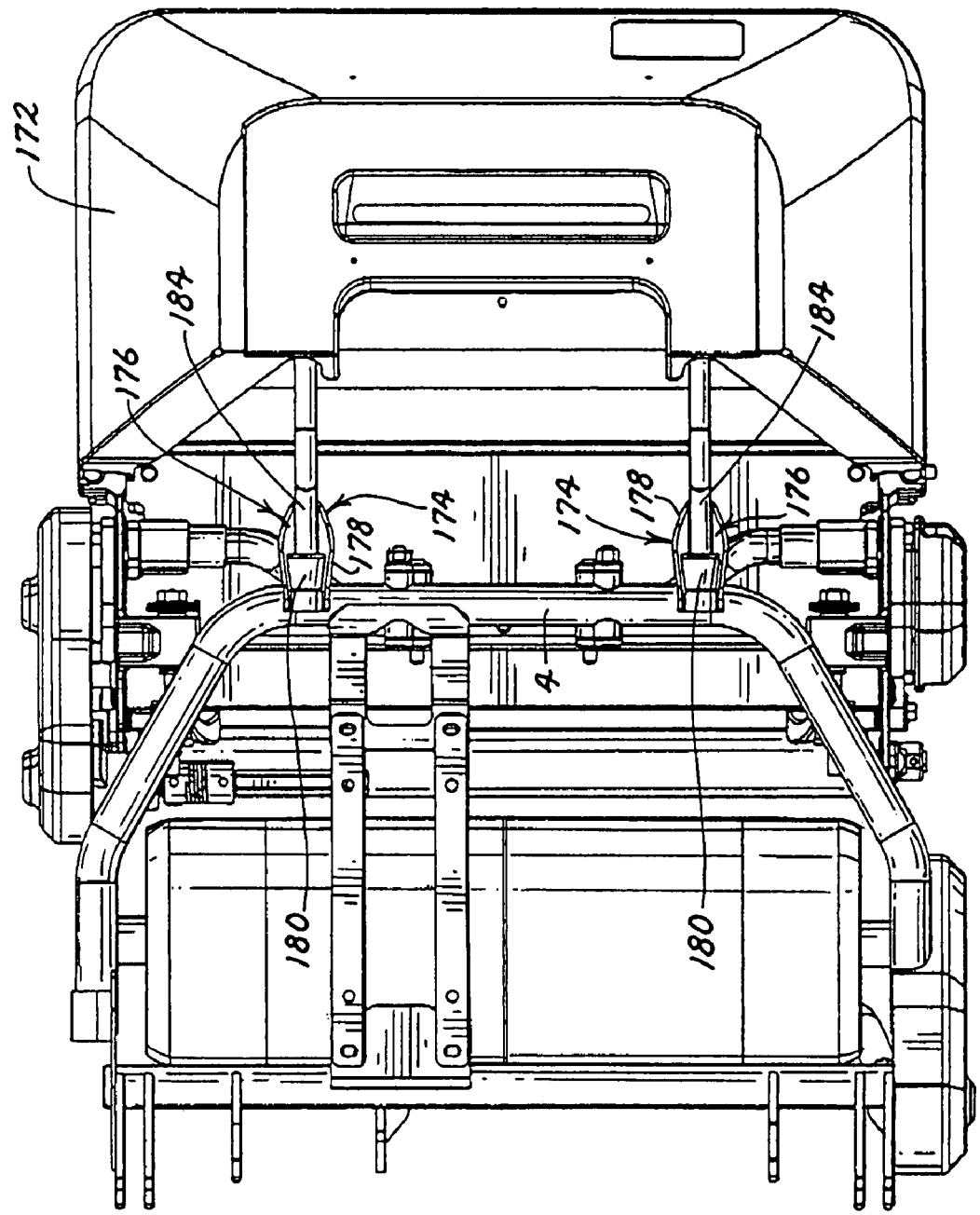
FIG. 18 is a top plan view of that portion of the walk reel mower shown in FIG. 17.

To avoid this problem, the Applicants' disclose herein two transversely spaced sockets 174 on reel mower frame 4 for receiving seating pins 182 on grass basket 172. This subject matter is most clearly shown in FIGS. 17-19.

Each socket 174 is attached to the front of reel mower frame 4 generally overlying reel cutting unit 18. Each socket 174 is shaped as an upwardly facing trough 176 having spaced side walls 178 connected to each other at the bottom. For example, trough 176 could have a channel shape with vertical side walls and a flat bottom, a V-shape, a U-shape, etc. Trough 176 of each socket 174 is open at the front but is closed at the rear by a top wall 180. Thus, socket 174 has an upwardly open front portion and an upwardly closed rear portion. In addition, trough 176 of each socket 174 is upwardly inclined as it extends forwardly. See FIG. 19.

The grass basket 172 has two rearwardly extending seating pins 182 each having a downwardly inclined distal leg 184. When grass basket 172 is flat and level, the angle of inclination of distal leg 184 matches the angle of inclination of socket 174 allowing distal leg 184 to be inserted into socket 174 with leg 184 then being received in socket 174. Each leg 184 fits down into one socket 174 with leg 184 being long enough to fit down into the upwardly closed rear portion of socket 174 beneath top wall 180. However, the front portion of each socket 174 is open at the top and is not similarly constricted by a top wall 180.

When the operator lifts up on the rear of walk reel mower 2, the front of walk reel mower 2 pivots downwardly about traction drum 12 so that sockets 174 begin pivoting downwardly as well. This downward pivoting motion of sockets 174 effectively causes grass basket 172 to engage the ground which, in turn, causes distal legs 184 of pins 182 to pivot upwardly relative to sockets 174, i.e. distal legs 184 will actually pivot upwardly at least partially through the upwardly open front portion of sockets 174. However, since the front portion of sockets 174 is upwardly open and is not enclosed by a top wall, there is no camming force exerted on distal legs 184 by sockets 174 that is sufficient to cam pins 182 out of sockets 174. This avoids inadvertently disengaging grass basket 172 from reel mower frame 4. Accordingly, grass basket 172 will more easily stay seated on reel mower frame 4 with the socket 174/seating pin 182 configuration shown herein than with prior art configurations, even when grass basket 172 is loaded with grass clippings.

The Bedknife Mounting

Figure 20:
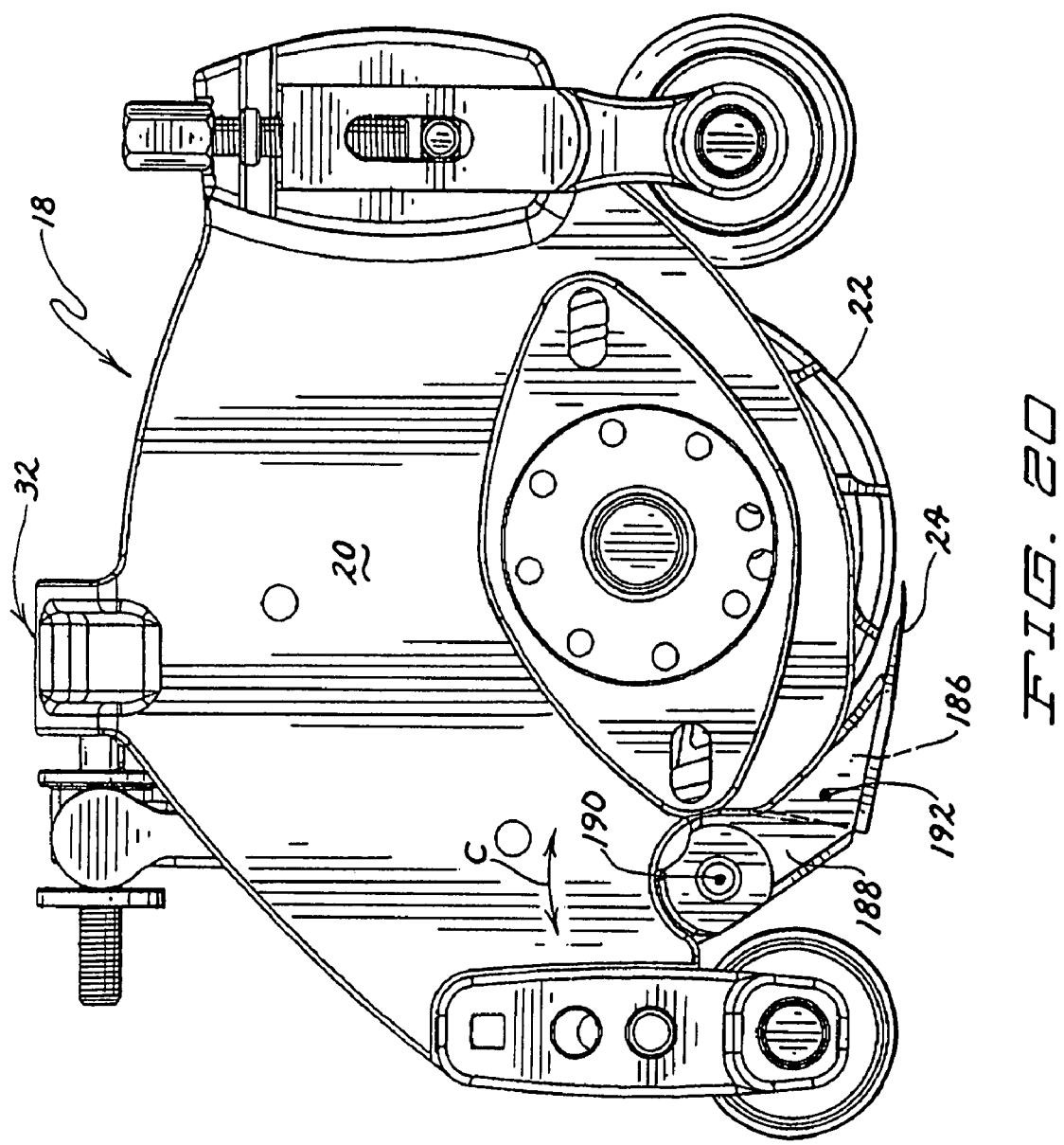
FIG. 20 is a side elevational view of the reel cutting unit used in the walk reel mower of this invention, particularly illustrating the pivotal mount for the bedknife.

Referring now to FIG. 20, bedknife 24 is typically mounted to the bottom of a triangular bedbar 186 that is itself attached to pivotal support arms 188 at either side of reel cutting unit 18. Support arms 188 pivot about a pivot axis identified as 190. Bedknife adjusters 32 work, in a known manner, by pivoting support arms 188 about pivot axis 190 in the direction of arrows C in FIG. 20.

As cutting reel 22 wears, the outside diameter of reel 22 shrinks and the distance between bedknife 24 and the outside diameter of reel 22 grows. When this distance becomes too large, the quality of cut is adversely affected. Thus, it is periodically necessary to rotate bedknife 24 in a direction (i.e. a counter-clockwise direction in FIG. 20) which moves bedknife 24 upwardly towards reel 22 to compensate for wear on reel 22. Again, this is the basic purpose of bedknife adjusters 32 and the use of such adjusters for this type of adjustment is well known in the art.

In prior art reel mowers of this type having a pivotal bedknife which pivots towards the cutting reel to compensate or adjust for reel wear, the bedbar/bedknife combination would typically pivot about a pivot axis located generally at the rear of bedbar 186. This prior art pivot axis is shown in FIG. 20 as 192. The Applicants have discovered that the placement of prior art pivot axis 192 and the geometry of bedbar 186 relative to reel 22 causes the front edge of bedknife 24 to also move rearwardly relative to reel 22 as it moves upwardly. Thus, in prior art reel mowers, as the bedknife was progressively pivoted up to compensate for wear in the cutting reel, the line of contact between the bedknife and the cutting reel would progressively shift rearwardly. As this happens, the Applicants further discovered that the cutting reel would become more aggressive in its cutting action and the quality of the cut would change.

In reel mowers of this type, particularly those used for cutting greens on golf courses to very low height of cuts, it is important that the quality of cut remain consistent and not change over time. As just noted above, the quality of cut does change in prior art mowers when the bedknife is pivoted up towards the cutting reel to compensate for wear.

This invention relates to a new location 190 for the pivot axis for the bedbar 186/bedknife 24 combination that is raised and slightly to the rear of the usual location 192 for this pivot axis. This new location has been selected, in conjunction with the geometry of the bedbar 186/bedknife 24 combination in relation to cutting reel 22, so that the rearward shifting of the line of contact between bedknife 24 and reel 22 does NOT occur. In other words, in a reel mower according to this invention, as bedknife 24 pivots about pivot axis 190, the new location 190 for the pivot axis of bedknife 24 ensures that the front edge of bedknife 24 now stays in approximately the same longitudinal location (within about 0.005 inches) relative to cutting reel 22 as the front edge of bedknife 24 rises. This ensures that the quality of cut remains much more consistent even as bedknife 24 is adjusted to compensate for reel wear.

Bedknife 24 has been shown as a separate component on the bottom of bedbar 186 to allow ease of removal of bedknife 24 for sharpening or replacement. However, bedbar 186 and bedknife 24 could be integrally formed with one another or bedknife 24 could be supported in some other fashion for pivoting motion on reel cutting unit 18. The pivotal bedknife mounting disclosed herein could also be used on reel mowers carried on or formed as part of riding mowers.

The Back Plate of the Reel Cutting Unit

Figure 21:
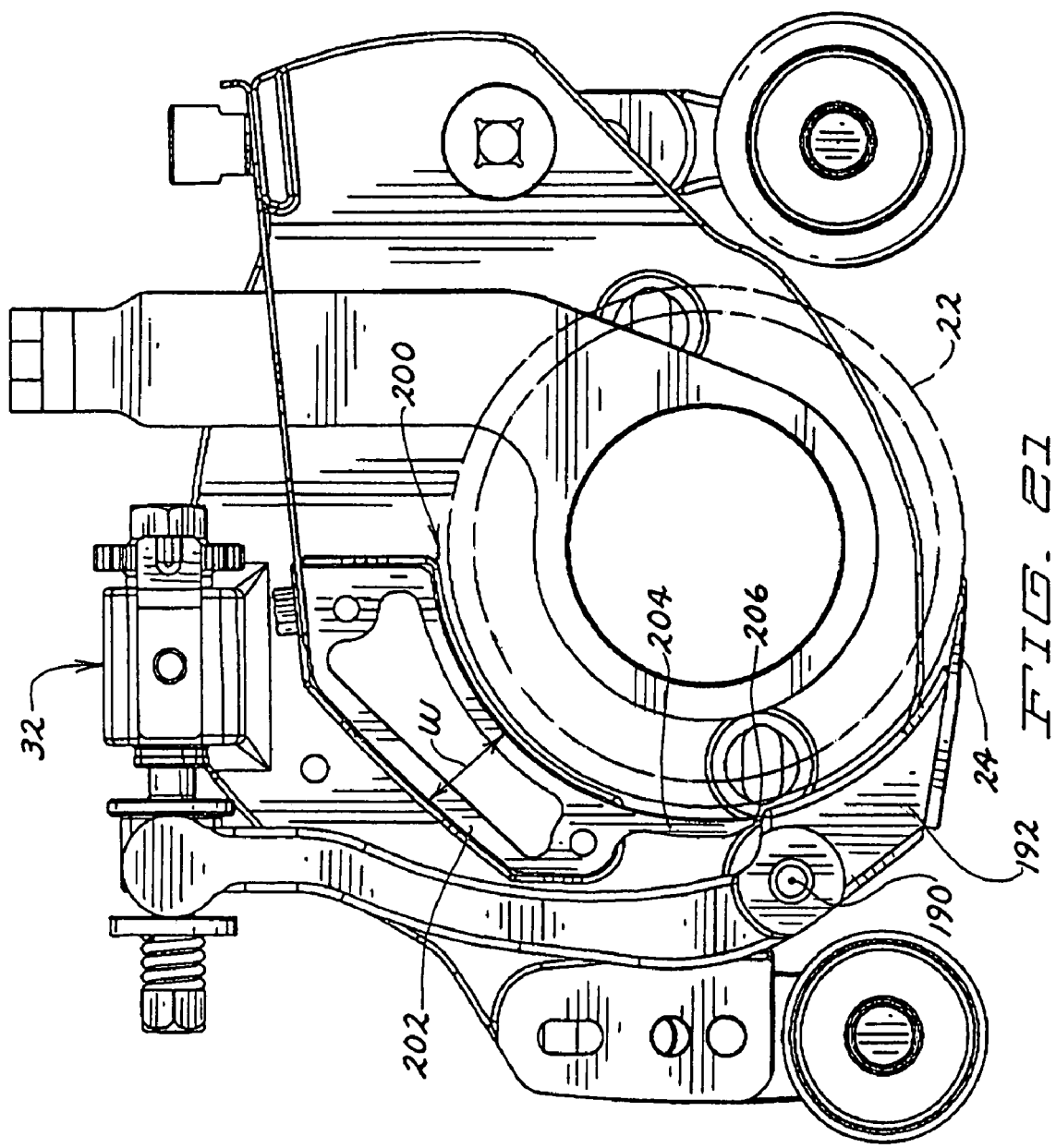
FIG. 21 is a side elevational view of the reel cutting unit used in the reel mower of this invention with one of the side plates removed to show the cross-sectional shape of the back plate of the reel cutting unit frame.

Referring now to FIG. 21, an improved back plate for a reel cutting unit is shown generally as 200. The back plate has an upper portion 202 and a lower lip 204 protruding forwardly and downwardly from upper portion 202. Upper portion 202 has a closed, tubular cross-sectional configuration in the form of a hollow beam to provide strength. Lower lip 204 is solid, rather than being hollow, and is relatively thin compared to the thickness of upper portion 202.

Preferably, back plate 200 can be extruded in one piece out of aluminum. Thus, back plate 200 is light, but yet strong because of the hollow beam configuration of upper portion 202. Back plate 200 can be made sufficiently strong so that it alone will provide sufficient strength to unite side plates 20 without having the usual additional cross-members or stringers that normally are secured at each end to side plates 20 to provide strength. Back plate 200 as disclosed herein can be used on reel cutting units for walk reel mowers or for riding mowers.

Various other modifications of this invention will be apparent to those skilled in the art. Accordingly, the invention is to be limited only by the appended claims.

We claim:

1. A reel cutting unit for a reel mower, which comprises:
   (a) a reel cutting unit frame comprising spaced side plates connected to an arcuate back plate, wherein the reel cutting unit frame is self supporting for rolling over the ground by front and rear rollers extending between the side plates with the front and rear rollers allowing the reel cutting unit frame to adapt to changes in ground contour by pivoting the reel cutting unit frame about both a transverse roll axis and a longitudinal roll axis relative to remaining portions of the reel mower on which the reel cutting unit is carried, wherein each of the front and rear rollers has an axis of rotation relative to the side plates, and wherein the axis of rotation of the front roller is vertically movable up and down relative to each side plate by a height of cut adjustment mechanism carried on the reel cutting unit frame;
   (b) a helically bladed cutting reel rotatably journalled between the side plates and positioned in front of the back plate and between the front and rear rollers;
   (c) a bedknife extending between the side plates along the length of cutting reel for cooperating with the cutting reel to cut grass, the bedknife being pivotally adjustable about a pivot axis relative to the side plates to compensate for wear in the cutting reel, wherein the pivot axis of the bedknife is located longitudinally between an axis of rotation of the cutting reel and the axis of rotation of the rear roller; and
   (d) wherein the pivot axis of the bedknife is located vertically above the axis of rotation of the rear roller in a location that is chosen such that the front edge of the bedknife stays within about 0.005 inches of the same longitudinal location relative to the cutting reel as the front edge of the bedknife rises upwardly to compensate for wear in the cutting reel.

* * * * *